(12) United States Patent
Nagel et al.

(10) Patent No.: US 7,869,591 B1
(45) Date of Patent: Jan. 11, 2011

(54) SYSTEM AND METHOD FOR SECURE THREE-PARTY COMMUNICATIONS

(76) Inventors: Robert H. Nagel, 2124 Broadway, PMB 123, New York, NY (US) 10023; David P. Felsher, 158 Blackhouse Rd., Trumbull, CT (US) 06611; Steven M. Hoffberg, 29 Buckout Rd., West Harrison, NY (US) 10604

( * ) Notice: Subject to any disclaimer, the term of this patent is extended or adjusted under 35 U.S.C. 154(b) by 848 days.

(21) Appl. No.: 11/676,244

(22) Filed: Feb. 16, 2007

Related U.S. Application Data

(63) Continuation of application No. 10/106,138, filed on Mar. 25, 2002, now Pat. No. 7,181,017.

(51) Int. Cl.
*H04L 9/00* (2006.01)
(52) U.S. Cl. .......................... 380/28; 380/282
(58) Field of Classification Search ............ 380/44, 380/277, 282, 28; 726/2, 27
See application file for complete search history.

(56) References Cited

U.S. PATENT DOCUMENTS

| | | | | |
|---|---|---|---|---|
| 4,918,728 | A | * | 4/1990 | Matyas et al. ............ 380/280 |
| 5,500,899 | A | * | 3/1996 | Snow ........................ 380/47 |
| 5,638,445 | A | * | 6/1997 | Spelman et al. .......... 705/77 |
| 6,084,969 | A | * | 7/2000 | Wright et al. ............ 380/271 |
| 6,571,277 | B1 | | 5/2003 | Daniels-Barnes et al. |
| 6,587,946 | B1 | | 7/2003 | Jakobsson |
| 6,625,734 | B1 | * | 9/2003 | Marvit et al. ............ 726/28 |
| 6,665,705 | B1 | | 12/2003 | Daniels-Barnes et al. |
| 6,687,822 | B1 | | 2/2004 | Jakobsson |
| 6,779,111 | B1 | | 8/2004 | Gehrmann et al. |
| 6,859,533 | B1 | | 2/2005 | Wang et al. |
| 6,937,726 | B1 | | 8/2005 | Wang |
| 6,959,388 | B1 | | 10/2005 | Bleumer |
| 7,162,639 | B1 | | 1/2007 | Bleumer |
| 7,181,017 | B1 | | 2/2007 | Nagel et al. |

(Continued)

OTHER PUBLICATIONS

Blaze, et al., "Atomic Proxy Cryptography"; ftp://ftp.research.att.com/dist/mab/proxy.ps.

*Primary Examiner*—Gilberto Barron, Jr.
*Assistant Examiner*—David Le
(74) *Attorney, Agent, or Firm*—Steven M. Hoffberg; Ostrolenk Faber LLP.

(57) ABSTRACT

A system and method for communicating information between a first party and a second party, comprising the steps of receiving, by an intermediary, an identifier of desired information and accounting information for a transaction involving the information from the first party, transmitting an identifier of the first party to the second party, and negotiating, by the intermediary, a comprehension function for obscuring at least a portion of the information communicated between the first party and the second party. The data transmission may be made secure with respect to the intermediary by providing an asymmetric key or direct key exchange for encryption of the communication between the first and second party. The data transmission may be made secure with respect to the second party by maintaining the information in encrypted format at the second party, with the decryption key held only by the intermediary, and transmitting a secure composite of the decryption key and a new encryption key to the second party for transcoding of the data record, and providing the new decryption key to the first party, so that the information transmitted to the first party can be comprehended by it.

21 Claims, 10 Drawing Sheets

U.S. PATENT DOCUMENTS

| | | |
|---|---|---|
| 7,286,665 B1 | 10/2007 | Wang |
| 7,290,132 B2 | 10/2007 | Aboba et al. |
| 7,356,688 B1 | 4/2008 | Wang |
| 7,412,519 B2 | 8/2008 | Wang |
| 7,412,605 B2 | 8/2008 | Raley et al. |
| 7,421,741 B2 | 9/2008 | Phillips et al. |
| 7,500,104 B2 | 3/2009 | Goland |
| 7,523,072 B2 | 4/2009 | Stefik et al. |
| 7,558,759 B2 | 7/2009 | Valenzuela et al. |
| 7,603,319 B2 | 10/2009 | Raley et al. |
| 7,609,848 B2 | 10/2009 | Wang et al. |
| 7,664,708 B2 | 2/2010 | Stefik et al. |
| 7,685,642 B2 | 3/2010 | Gilliam et al. |
| 7,720,767 B2 | 5/2010 | Ta et al. |
| 7,724,896 B2 | 5/2010 | Nimour et al. |
| 7,725,401 B2 | 5/2010 | Raley et al. |
| 2001/0008013 A1* | 7/2001 | Johnson et al. .............. 713/170 |
| 2001/0013021 A1* | 8/2001 | Saito ........................... 705/51 |
| 2002/0023215 A1* | 2/2002 | Wang et al. ................. 713/171 |
| 2002/0094081 A1* | 7/2002 | Medvinsky .................. 380/44 |

\* cited by examiner

SYSTEM AND METHOD FOR SECURE THREE-PARTY COMMUNICATIONS

RELATED APPLICATIONS

The present application is a continuation of U.S. patent application Ser. No. 10/106,138, filed Mar. 25, 2002, now U.S. Pat. No. 7,181,017, the entirety of which is expressly incorporated herein by reference.

FIELD OF THE INVENTION

The present invention relates to the field of secure communications, and more particularly to multiparty communications supporting transactional accounting.

BACKGROUND OF THE INVENTION

Computerized records and database are employed in many industries. Often, the information is made available subject to usage rights limitations. For example, copyright information is generally controlled by the copyright owner, such that copying is controlled or prohibited after publication. In a digital environment, each transmission of the content results in a form of copying, such that a copyright owner cannot impose a strict prohibition on all forms of copying while promoting digital use of the content. Thus, the publisher or content owner seeks to apply rules that provide appropriate compensation. In other instances, the issue is not content, but rather security and privacy. In these cases, the rules limit access based on an authorization, which may be express or implied.

Conceptually, implementation of an economic permission and security permission based access control systems are similar. In fact, security based access control systems often include logs and audit trails, which are similar to the accounting databases associated with economic permission systems. Thus, many issues raised by these systems are similar.

Computer and information system security is currently an important issue. With the proliferation of computers and computer networks into all aspects of business and daily life—entertainment, financial, medical, education, government, and communications—the concern over secure file access and communications privacy is growing.

Publicly accessible secure database systems pose significant security problems. Attempts to achieve high levels of technical invulnerability may lead to practical problems, system weaknesses and security holes. Passwords may be written near access terminals. Security tokens can be stolen or misplaced. Users may share supposedly secret information. Administration capability bypasses normal security protocols. Secure systems may be built on insecure platforms. Therefore, it is desirable to maintain private information in secure format, without relying on trust of any party who does not require access to the private information, up to a point where it is used by the intended recipient of the information.

The liability or risks involved in holding or communicating private information can well exceed the value of the storage or communications services. Therefore, even in the case of a trusted party, indemnification or insurance may be inefficient or insufficient means for addressing these risks or liabilities. Rather, where considerable risk or liability arises from unauthorized disclosure of the information, the storage or communication of the information must involve an efficient scheme that will minimize the risk of disclosure. Therefore, an intermediary in a transaction preferably handles only encrypted data, and need not be trusted to maintain the privacy of the underlying message. While two-party encryption is well known, schemes are not well developed for providing third party involvement, wherein the third party plays a requisite role in the transaction but which need not be trusted with access to the information or the cryptographic key.

A number of communications systems and methods are known for dealing with three-party communications, for example, where a third party provides ancillary services to support the communications, such as authentication, accounting, and key recovery. Often, the nature of these communications protocols places the third party (or group of third parties) in a position of trust, meaning that the third party or parties, without access to additional information, can gain access to private communications or otherwise undermine transactional security or privacy.

Transactions for which third party support may be appropriate include distribution of private medical records, communication of digital content, and anonymous proxy services.

Another aspect of three party communications is that it becomes possible to two (or more) parties to hold portions of a secret or a key to obtain the secret, without any one party alone being able to access the secret. For example, Silvio Micali has developed a mature Fair Encryption scheme in which a number of trustees collaborate to hold portions of a key used to secure privacy of a communication between two principals, but who must act together to gain access to the secret. In Micali's Fair Encryption scheme, however, cooperation of neither of the principal parties to the communication is required in order to access the secret. The third party trustees, as a group, are trusted with a secret. The basis for this trust is an issue of factual investigation. The Micali Fair Encryption scheme does, however, provide a basis for the generation and use of composite asymmetric encryption keys. See, Eyal Kushilevitz, Silvio Micali & Rafael Ostrovsky, "Reducibility and Completeness in Multi-Party Private Computations", Proc. of 35th FOCS, pp. 478-489, 1994, expressly incorporated herein by reference.

The Micali Fair Encryption scheme does not, however, allow communication of a secret in which only one party gains access to the content, and in which the third party or parties and one principal operate only on encrypted or secret information. These system is discussed in further detail below.

See: S. Micali. Fair Public-Key Cryptosystems. Advances in Cryptology—Proceedings of CRYPTO'92 (E. F. Brickell, ed.) Lecture Notes in Computer Science 740, SpringerVerlag (1993) pages 113-138; S Micali, Fair cryptosystems, MIT Technical Report, MIT/LCS/TR-579, November 1993, MIT Laboratory for Computer Science, November 1993.

Encryption Technologies

Encryption technologies, particularly public key encryption systems, seek to minimize some of these weaknesses by reducing the need to share secrets amongst participants to a secure or private communication. Typical public key encryption technologies, however, presume that a pair of communications partners seek to communicate directly between each other, without the optional or mandatory participation of a third party, and, in fact, are designed specifically to exclude third party monitoring. Third parties, however, may offer valuable services to the participants in a communication, but existing protocols for involvement of more than two parties are either inefficient or insecure.

Traditional encryption algorithm schemes rely on use of one or more finite keys which are provided to an algorithm which generates a data string which is apparently random, called pseudorandom, but which can be predicted based on a knowledge of both the algorithm and the key(s), allowing extraction of a superimposed data message. Optimality of an algorithm for a given set of circumstances is based on a number of factors, and therefore many different cryptographic schemes coexist. Essentially, the key should be sufficiently long and stochastic that an extraordinarily long period of time would be necessary to attempt a brute force attack on the algorithm, while only a reasonable amount of time is required to generate keys, encrypt and decrypt messages. In addition, the key should be sufficiently long that observation of pseudorandom (encrypted) datastreams does not permit one to determine the key to the algorithm.

Public Key Encryption is a concept wherein two keys are provided. The keys form a pair, such that a message encrypted with one key of the pair may be decrypted only by the corresponding key, but knowledge of the public key does not impart effective knowledge of the private key. Typically, one of the keys is made public, while the other remains secret, allowing use for both secure communications and authentication. Communications may include use of multiple key pairs, to provide bilateral security. The public key pair may be self-generated, and therefore a user need not transmit the private key. It must, however, be stored.

The basis for Diffie Hellman and RSA-type public key encryption methods is the large disparity in computational complexity between decrypting the public key created cipher text with the public key encryption private key, which is very rapid and simple to do, and working through the possibilities without the key, which takes a very long time through all known means. The systems are theoretically secure because the combination of the public key and the source information generate this theoretically long time to factor the possibilities without requiring the public key encryption private key to be known by the sender.

Modern public-key data encryption was originally suggested by Diffie and Hellman, "New Directions In Cryptography," I.E.E.E. Transactions on Information Theory (November 1976) (the disclosure of which is hereby incorporated by reference), and was further developed by Ronald L. Rivest, Adi Shamir, and Leonard M. Adleman: "A Method for Obtaining Digital Signatures and Public-Key Cryptosystems," Communications of the ACM 21,2 (Feb. 1978), 120-126 (the disclosure of which is hereby incorporated by reference). See also, U.S. Pat. No. 4,351,982, expressly incorporated herein by reference.

The basic reason for public-key encryption system is to ensure both the security of the information transferred along a data line, and to guarantee the identity of the transmitter and to ensure the inability of a receiver to "forge" a transmission as being one from a subscriber on the data line. Both of these desired results can be accomplished with public-key data encryption without the need to maintain a list of secret keys specific to each subscriber on the data line, and without requiring the periodic physical delivery or the secure electronic transmission of secret keys to the various subscribers on the data line.

According to the Diffie Hellman scheme, two hosts can create and share a secret key without ever communicating the key. Each host receives the "Diffie-Hellman parameters". A prime number, 'p' (larger than 2) and "base", 'g', an integer that is smaller than 'p'. The hosts each secretly generate their own private number, called 'x', which is less than "p−1". The hosts next generate a respective public key, 'y'. They are created with the function: $y=g^x$ Mod p. The two hosts now exchange their respective public keys ('y') and the exchanged numbers are converted into a secret key, 'z' by the following function: $z=y^x$ Mod p. 'z' can now be used as an encryption key in a symmetric encryption scheme. Mathematically, the two hosts should have generated the same value for 'z', since according to mathematical identity theory, $$z=(g^x \bmod p)^{x'} \bmod p=(g^{x'} \bmod p)^x \bmod p.$$

A method of public-key encryption developed by Rivest, Shamir & Adelman, and now generally referred to as RSA, is based upon the use of two extremely large prime numbers which fulfill the criteria for the "trap-door, one-way permutation." Such a permutation function enables the sender to encrypt the message using a non-secret encryption key, but does not permit an eavesdropper to decrypt the message by crypto-analytic techniques within an acceptably long period of time. This is due to the fact that for a composite number composed of the product of two very large prime numbers, the computational time necessary to factor this composite number is unacceptably long. A brute force attack requires a sequence of putative keys to be tested to determine which, if any, is appropriate. Therefore a brute force attack requires a very large number of iterations. The number of iterations increases geometrically with the key bit size, while the normal decryption generally suffers only an arithmetic-type increase in computational complexity.

In the RSA encryption algorithm, the message (represented by a number M) is multiplied by itself (e) times (called "raising (M) to the power (e)"), and the product is then divided by a modulus (n), leaving the remainder as a ciphertext (C): $C=M^e$ mod n. In the decryption operation, a different exponent, (d) is used to convert the ciphertext back into the plain text: $M=C^d$ mod n. The modulus (n) is a composite number, constructed by multiplying two prime numbers, (p) and (q), together: n=p*q. The encryption and decryption exponents, (d) and (e), are related to each other and the modulus (n) in the following way: $d=e^{-1} \bmod ((p-1)(q-1))$. The RSA ciphertext is thus represented by the expression $C=M^e$ mod n. The associated decryption function is $M=C^d$ mod n. Therefore, $M=C^d \bmod n=(M^e \bmod n)^d \bmod n$, indicating that the original message, encrypted with one key, is retrieved as plain text using the other key. To calculate the decryption key, one must know the numbers (p) and (q) (called the factors) used to calculate the modulus (n).

The RSA Algorithm may be divided, then, into three steps:

(1) key generation: in which the factors of the modulus (n) (the prime numbers (p) and (q)) are chosen and multiplied together to form (n), an encryption exponent (e) is chosen, and the decryption exponent (d) is calculated using (e), (p), and (q).

(2) encryption: in which the message (M) is raised to the power (e), and then reduced modulo (n).

(3) decryption: in which the ciphertext (C) is raised to the power (d), and then reduced modulo (n).

Micali, U.S. Pat. Nos. 6,026,163 and 5,315,658, expressly incorporated herein by reference, teach a number of split key or so-called fair cryptosystems designed to allow a secret key to be distributed to a plurality of trusted entities, such that the encrypted message is protected unless the key portions are divulged by all of the trusted entities. Thus, a secret key may be recovered, through cooperation of a plurality of parties. These methods were applied in three particular fields; law enforcement, business auctions, and financial transactions.

Essentially, the Micali systems provide that the decryption key is split between a number (n) of trusted entities, meeting the following functional criteria: (1) The private key can be reconstructed given knowledge of all n of the pieces held by the plurality of trusted entities; (2) The private key cannot be guessed at all if one only knows less than all (<n−1) of the special pieces; and (3) For i–1, ... n, the $i^{th}$ special piece can be individually verified to be correct. The special pieces are defined by a simple public algorithm which itself exploits the difficulty in factoring large numbers as a basis for asymmetric security.

Electronic Medical Records

In the field of medical care, accuracy of collected data is of significant importance. Erroneous data, whether collected manually or automatically, presents the possibility of an erroneous diagnosis or treatment. Prior accumulated data about the patient may be relevant to future diagnosis and treatment. Therefore, preservation and availability of accurate medical records remains an important part of the modern health care system.

The art of medical record keeping has developed over centuries of medical practice to provide an accurate account of a patient's medical history. Record keeping in medical practice was developed to help physicians, and other healthcare providers, track and link individual "occurrences" between a patient and a healthcare provider. Each physician/ patient encounter may result in a record including notes on the purpose of the visit, the results of physician's examination of the patient, and a record of any drugs prescribed by the physician. If, for example, the patient were referred to another clinic for additional testing, such as a blood analysis, this would form a separate medical encounter, which would also generate information for the medical record.

Over the years, paper medical records have evolved from individual practitioners' informal journals to the current multi-author, medical/legal documents. These paper records serve as the information system on which modern medical practice is based. While the paper-based medical record system has functioned well over many decades of use, it has several shortcomings. First, while a paper-based record system can adequately support individual patient-physician encounters, it is cumbersome to use as a source of pooled data for large-scale analysis. While the medical data in the paper-based records is substantial, the ability to adequately index, store and retrieve information from the paper-based mechanisms prevents efficient analysis of the data. Thus, paper medical records could be a rich source of information for generating new knowledge about patient care, if the data could be accessed on a large scale. Second, each portion of the paper-based record is generated and kept at the site of the medical service. Hence, the total record is fragmented among many sites. Consequently, access by off-site physicians is less than optimal. The inability to access a complete medical record in a short period of time presents problems both for individual care and group care of patients. Thus, electronic medical records (EMRs) have been developed to facilitate storage, retrieval, communication and use of the valuable patient medical history information, both for the particular patient and for studies of patient populations.

While there have been attempts to develop computer database architectures capable of storing and retrieving medical record information which reconcile physicians' desires for maintaining a format of unstructured medical information with database requirements for highly structured data storage, these systems provide an inadequate infrastructure for the efficient transmission, use and security protection of the data.

Medical information poses significant challenges to knowledge management systems. Medical information presently includes file types including various media types, including numeric data, text, scanned text images, scanned graphic images, sound (e.g., phonocardiography and dictation), high resolution images (radiology) and video (ultrasonic imaging and fluoroscopy). The medical records for an individual may, over time, grow to multiple megabytes or even gigabytes of data, and advanced medical techniques promise to increase the volume of available data. These records come from a number of different medical service providers, and may be stored in geographically disparate locations. Often, a new medical service provider will seek to review all appropriate previous medical records for a patient. Further, in third party reimbursement situations, the third party indemnitor will seek to review records in connection with billed services. These various data types and associated information storage systems are not standardized, impeding efficiency of sharing and communicating the data.

Medical records often include data that is intensely personal, including personal data such as sexual habits, drug abuse, psychological disorders, family histories, genetics, terminal diseases, injuries, and the like. This personal information is revealed to, or generated by, treating medical professionals on a presumption of absolute privilege held by the patient. The adoption of electronic medical record systems should not impair this presumption. Thus, while there are legitimate reasons for transmitting medical information files, such transmission must be secure, limited to appropriate circumstances and to authorized recipients.

Indeed, while the private medical information technically cannot be disclosed without the consent of the patient, since at least the time of Hippocrates, the medical institutions that hold this information guard it jealously. Thus, privacy considerations may make it difficult to obtain collaboration between medical institutions in the ongoing treatment of a patient. While there are important legitimate uses for medical data, there is also a substantial possibility for abuse of the data and the associated trust relationship between patient and medical care provider represented therein. Presently, laws and regulations have been promulgated (but not yet effective) regulating electronic medical records.

Typically, in a hospital medical information system, information relating to patients in a database is generated and used by users having a variety of roles, including doctors and medical professionals of various specialties, nurses, therapists of various types, paraprofessionals, social workers, clinical laboratories, and bedside devices (which may automatically generate or receive patient information). In addition, medical information is used, but typically not generated by, pharmacies, administrators, lawyers, insurers or payors, and other parties. Because of the many types of caregivers and other data users, the idea of role-based access is appropriate; basically, medical professionals of different types will require access to various subsets of the medical record. For example, typically the primary care physician and certain consults will require full access.

One scheme for increasing the portability of medical records is to provide personal data storage devices, for example in credit card format optical storage medium. These devices, however, present a security risk, since it cannot be presumed that the patient will be able to provide consent to the use of the information when required; thus, access controls must necessarily be compromised. Further, the information carrier can be lost, unavailable or stolen.

SUMMARY OF THE INVENTION

The present invention provides a system, method and business model for conducting transactions involving private information wherein an intermediary performs a requisite function with respect to the transaction without requiring the intermediary to be trusted with respect to the private information or cryptographic keys for communicated information. This system and method employ secure cryptographic schemes, which reduce the risks and liability for unauthorized disclosure of private information, while maintaining efficient and robust transactions.

The system and method according to the present invention provide a basis for a set of business models, in which the third party accounts for secure data transactions, by maintaining a critical logical function in data communication. Thus, during each such transaction, the intermediary may force or require a financial accounting for the transaction. Further, by exerting this control over the critical function outside the direct communication channel, the intermediary maintains a low communication bandwidth requirement and poses little risk of intrusion on the privacy of the secure communication. Further, the intermediary never possesses sufficient information to unilaterally intercept and decrypt the communication.

The present invention also provides a system and method for providing ancillary services with respect to communicating information. These ancillary services encompass, for example, applying a set of rules governing an information communication transaction. For example, the rules limit access based on recipient authentication, define a financial accounting, role or class of an intended recipient, or establish other limits. These services may also include logging communications or assist in defining communications counterparties. The access control is implemented by an intermediary to the underlying transaction, which facilitates the transaction by removing the necessity for a direct and contemporaneous communication with the equitable holder of a pertinent right for each transaction. The intermediary maintains a set of right-associated rules, over which it may hold legal title. The intermediary serves as a trustee, applying the rules on behalf of the equitable owner of the right. In order to enforce rights-based restrictions, the trustee may hold, associated with the rights information, a key, for example an encryption key, necessary for access or use of the information. This arrangement is termed herein a Virtual Trust, and the intermediary is therefore a termed Virtual Trustee.

According to the present invention, the Virtual Trustee is trusted to implement the rules, but not necessarily trusted with access to, or direct and sole access control over the information. According to a preferred embodiment, the Virtual Trustee, acting alone, cannot access or eavesdrop on the private information or a communication stream including the information. Further, in accordance with the Micali split key escrow scheme, the Virtual Trustee may be implemented as a set of entities, each holding a portion of a required key.

The present invention also provides enhancements to traditional secure communications by providing involvement of a third party, or intermediary, who need not, and preferably does not, have access to the communicated information, while providing transaction-support services between the two parties involved in the communication. According to a further embodiment of the invention, only one party to the communication is privy to the secured information; the host for transmission of the information does not, as a part of the transaction, access the information itself.

Thus, the system according to the present invention provides a conduit for the authorized transmission of records, such as medical records, while maintaining the security of the records against unauthorized access. A preferred communications network is the Internet, a global interconnected set of public access networks, employing standardized protocols. Thus, the records may be transmitted virtually anywhere on earth using a single infrastructure. Alternately, private networks or virtual private networks may be employed. In fact, as the system according to the present invention gains ubiquity, a private network model would be preferred, in order to increase security and allow the system to be tuned to the types of data and quality of service demands made by users.

An embodiment of the present invention involves the implementation and use of a Virtual Trust, wherein an owner of rights in information entrusts the application of a set of rules and/or limitations, to a Virtual Trustee. The Virtual Trustee implements these rules and/or limitations, unless countermanded. One of the rules and/or limitations may be to seek input from the rights owner, if available.

According to one embodiment of the invention, a user provides to the intermediary necessary transactional information relating to private information, in a manner that discloses little or no private information to the intermediary. In like manner, private information may be supplied to a user after the user has supplied necessary transactional information to the intermediary, without in the process disclosing the private information to the intermediary. These techniques may be extended to allow personally identifying information to be removed from a communication by substitution with a non-personally identifying code, supplied by the intermediary. Again, this anonymous process may take place without providing the intermediary with the private information.

In some embodiments, the two principals to the communication remain anonymous with respect to each other, while in other instances, they are known to each other. In the former case, a proxy is provided to avoid divulging the address (e.g., logical or physical address) of the recipient, and, depending on communication protocol, the identity of the sender. The communication channel may remain secure between the two principals, although the proxy becomes trusted with respect to identities of the principals.

The intermediary may, as a matter of course, in the course of its duties, implement a set of rules on behalf of a rights-holder for the information, and indeed communications structures and protocols may be established to force a critical portion of each subject communication to pass through the intermediary.

Different rules may be applied, for example, based on the nature of the information, the role of the recipient, context of the information request, and preferences of a rights-holder of the information.

One embodiment of the present invention encompasses monetary transactions involving the information usage and/or communication. According to one embodiment, digital signatures may be employed in monetary transactions that, after authentication, become anonymous. Thus, according to the present invention, a personally identifying digital signature may be substituted by the intermediary with an anonymous transaction or session identifier. In this case, while the transaction becomes anonymous, it is not necessary for the intermediary to be a direct party to the underlying exchange of value, and thus the intermediary does not necessarily become privy to the exchange details.

In a medical embodiment, for example, a patient may, within the scope of available resources, define rules and procedures for access to his or her own medical records. Thus, the rules defined by a patient or record owner may differ from those imposed by the repository medical institution. A default set of rules may be provided which restricts access to medical professionals who can demonstrate authorization, with disclosure of particular transactional records limited according to the requestor's role or other set of rules. As trustee or agent for the patient, the intermediary may also implement more or less restrictive rules as defined by the patient, and release records accordingly. The intermediary may also implement a set of rules defined by the respective custodian medical institution in connection with its own internal processing or communications.

Presently, medical records typically include information that is integral with a physical embodiment. For example radiological records are integrated into the film. The original medical record, embodied in its physical manifestation, is "owned" by the originating institution or provider, subject to access control and copying requests by the patient. See, DeWitt et al, "Patient Information and Confidentiality", Treatise on Health Care Law, 16.01[3] (Kaufman et al., Eds., 1998). However, as electronic medical records gain prominence, and the physical manifestation of the medical records is transformed into information stored in a computer storage device, the medical record may ultimately be considered property of the patient, subject to retention of a non-distributable (or otherwise subject to limited rights) copy by the originating institution or provider. The present invention therefore provides a system through which a patient may exert various incidents of ownership over the electronic medical record, including access control, copying, retention, and accounting therefore. According to the present invention, this control may be exercised by entrusting the encryption key(s) for the electronic medical record with an intermediary, who acts under the direction and authority of the patient.

According to the present invention, the security and privacy scheme of the present invention may be employed to convey content to users while ensuring compensation for rights-holders in the content.

According to the present invention, an architecture is provided which allows accounting and implementation of various rules and limits on communications between two parties. Further, an intermediary becomes a necessary part of the negotiation for communication, and thus has opportunity to apply the rules and limits.

Traditionally, medical records maintenance and upkeep have imposed a significant cost and burden. While enterprises have evolved for outsourcing of certain functions, these enterprises have not particularly represented the interests of the patient, and rather serve as agents for the medical record custodian.

According to one embodiment of the present invention, each use of a record may trigger an accounting/audit event, thus allowing finely granular transactional records, that may reduce the risks of security and privacy breach in connection with record transmission. Importantly, the present invention allows usage based financial accounting for the information, imposing a financial burden according to a value and/or consumption of system resources. For example, the cost to a user could be a flat fee, depend on a number of factors, be automatically calculated, or relate to volume of usage.

In establishing a secure communications session between the user and the intermediary, it may be useful in some circumstances to employ a challenge-response authentication scheme, for example by passing messages back and forth between the user and the intermediary, the user and the data repository, or the data repository and the intermediary.

According to the present invention, the user's "role" may be checked for consistency with a set of role-based usage rules. The reported role may be accepted, or verified with resort to an authentication database. Based on the role of the user and the identification of the content, the authority of the user to receive records may be determined.

In one embodiment, a user is required to identify the specific records sought, and therefore the authorization matrix representing correspondence of record content and user role may be associated with each record, and verified by the data repository as a part of a local authentication process prior to transmitting any portion of a record. Thus, the matrix may represent a metadata format describing the content of the record and the level or type of authority of the User to access that record. This metadata may, of course, itself be privileged information.

In the event that the distribution of metadata or its application at a site is impermissible, a separate metadata processing facility may be provided. This facility may process the metadata in an anonymous index format, thus reducing or eliminating the risks or a privacy or security breach. The user authority matrix may be protected using the composite session key format according to the present invention, and therefore made secure even from the intermediary, which, in this case, may communicate the authority matrix and transactional request details to the metadata processing facility using a composite of a User session key and a Metadata session key. The results of the authorization may be transmitted directly from the metadata processing facility directly to the data repository, in the form of a prefiltered specific record request. The Intermediary may account for the transaction either on a request-made basis, or communicate accounting information with the data repository, for example to properly exchange required keys and complete the transaction.

The record indices may thus be maintained by entities privy to the private information, with results returned to the user, without requiring any disclosure to the intermediary, or by entities insulated from an association between a complete identification of the metadata and the content thereof. Preferably, the index entry for a record includes an identification of the location of the content record and a set of access rules, which are, for example, role based. Alternately, the intermediary may maintain the index locally and apply the respective rules.

The role-based access rules are generally defined automatically based on contextual and circumstantial data. Manual rules and edits may also be supported. Typically, a hierarchy is defined of data sensitivity, with the most sensitive data provided with the highest level of restrictions. Typically, primary care providers have the highest level of access, while paraprofessionals and other support personnel have data on a context-dependent requirements basis only. Further, non-professionals may be provided with data on a need-to-know basis only.

Other medical personnel have access to the record based on context and role. For example, a respiratory therapist might require access to pulmonary and central vascular history records, as well as to abstracts of acute medical information, current pharmaceutical information, scheduling (e.g., for inpatient care), and specific notes directed to the therapist, individually or as a part of a treatment group.

Thus, a past history of depression (resolved) in a patient admitted for a kidney stone would likely be communicated only to the primary care physician and psychiatric treating professional, if any. Possibly, this data would be communicated to a pain management professional, if the past history of depression had a pharmacological or drug abuse component. A surgical consultant, however, may be provided with the entire record. This data may also be deemed contextually irrelevant to the acute treatment.

For example, a treating physician, an oncologist, may seek, on behalf of a lung cancer patient, all radiologic studies of the chest over the past three months, as well as non-radiologic hospitalization records over the past three years and summary notes of other medical or surgical consultations or treatments over three years. The request, as well as a role-based identification of the oncologist, are relayed to the Intermediary, which may process this data internally, or relay it to a separate entity for processing. In the latter case, the information may be completely blinded, according to the present invention, from the Intermediary. Initially, the instructions of the patient are recalled from a database, to indicate any specific or general restrictions placed on the release of data. An exemplary role-based access authentication would determine that a primary treating oncologist is indeed authorized to receive radiological (chest) and recent hospitalization records. Further, the indices for the medical summary notes could be screened for pertinence criteria. Thus, information relating to a drug abuse rehabilitation center visit might be restricted upon request of the patient to mental health professionals. In this case, such private information could be screened from the oncologist, likely with some indication of the restriction, allowing the oncologist to subsequently request authorization from the patient. If, on the other hand, the requesting professional was a nurse, the indication of restricted information might not appear, since this indication itself might be deemed a disclosure and the apparent need is lower.

In order to provide further security for the records and the use of the system, various techniques are available. For example, dummy content records may be added to the database and index therefore. Any access of these records is presumably based on an attempt for unauthorized access. Thus, the existence of these records, with access tracking, allows detection of some unauthorized uses of the system. Another method of securing the system is the use of steganographic techniques, for example embedding watermarks in audio and images, pseudorandom dot patterns in scanned page images, random insertion of spaces between words, formatting information, or the like, in text records. Therefore, records obtained through the system may be identified by their characteristic markings. In fact, every authorized record may be subjected to a different set of markings, allowing a record to be tracked from original authorized access to ultimate disposition. An explicit bar code, watermark or other type of code may also be provided on the document for this purpose. It is noted that such markings cannot be implemented at the point of transmission on encrypted data, and thus this type of security requires access to the raw content. However, this may be implemented at the point of decryption, which may be in a sufficiently secure environment. For example, a secure applet may be provided, employing a securely delivered session key, which processes records to test for existing watermarks and to add or substitute a new watermark. Thus, the present invention provides a system for the decryption and watermarking of data, in a content (or content type)-specific manner. An online handshaking event may occur on decryption, to provide confirmation of the process, and indeed may also authenticate the user of the system during decryption.

According to the present invention, asymmetric key encryption may be employed to provide the establishment of secure communications channels involving an intermediary, without making the intermediary privy to the decryption key or the message. Thus, by transmitting only relatively unprivileged information, such as respective public keys, the information and integrity of the system remains fairly secure.

In order to provide a three party transaction in which the intermediary is a necessary party, the information sought to be transmitted is subjected to a secret incomprehension function (e.g., a cryptographic or steganographic function) with the key known only to the intermediary. In establishing the communication channel, the information is transcoded between a first comprehension function and a second comprehension function without ever being publicly available.

Modulo arithmetic is both additive and multiplicative, thus, using the same modulo n:

$$(A^x \bmod n \cdot A^y \bmod n) \bmod n = A^{x+y} \bmod n;$$

$$((A) \bmod n + (B) \bmod n) \bmod n = (A+B) \bmod n.$$

$$((A) \bmod n \cdot (B) \bmod n) \bmod n = (A \cdot B) \bmod n.$$

$$(A^x \bmod n)^y \bmod n = (A^y \bmod n)^x \bmod n = A^{xy} \bmod n$$

A preferred algorithm according to the present invention relies on the multiplicative property of modulo arithmetic; in other words, A mod B*C mod B=(A*C) mod B. However, this property is not "reversible", in that knowledge of (A*C) mod B and either A or C does not yield the other, unless the product A*C is less than B, since the modulo function always limits the operand to be less than the modulus value.

Thus, it is seen that in an RSA scheme, $M = C^d \bmod n = (M^e \bmod n)^d \bmod n$. Therefore, in order to communicate the intermediary private information to the intended recipient, the recipient public key 'e1' and intermediary private key 'd2' are defined using the same modulus n, multiplied, and provided to the sender. At the sender, the ciphertext $C2 = M^{e2} \bmod n$, previously encrypted with the intermediary's public key e2, is subjected to the function:

$C1 = C2^{d2 e1} \bmod n = M^{e1} \bmod n$. The recipient may then apply its private key d1 do decrypt the message: $M = C1^{d1} \bmod n$.

It should be understood that the algorithm described herein represents merely a portion of an RSA-type public key infrastructure, and that generally all known techniques for preparing the message, maintaining a public key directory, and the like, may be employed in conjunction therewith, to the extent not inconsistent. Thus, the transcoding algorithm should be considered as a generally interchangeable part of the entire cryptographic system, which may be substituted in various known techniques, to achieve the advantages recited herein. In general, only small changes will be necessary to the systems, for example, accommodating the larger composite key length. It is also particularly noted that there are a number of known barriers to exploits that are advantageously employed to improve and maintain the security of the present system and method.

See, David Chaum, "Blind Signatures for Untraceable Payments", Proceedings of Crypto 82, August 1982, p. 199-203. According to the Chaum scheme, a server assists a user in decrypting a message without releasing its secret key or gaining access to the encrypted message. The user communicates a symmetric function of the ciphertext to the server, which is then processed with the secret key, and the resulting modified ciphertext returned to the user for application of an inverse to the symmetric function. See, U.S. Pat. No. 6,192, 472, expressly incorporated herein by reference. This technique, however, requires a communication of the complete message in various encrypted forms to and from the server, a potentially burdensome and inefficient task, and is not adapted to communicate a secret file from a first party to a second party.

According to an embodiment of the present invention, a source privy to the communication employs a public key encryption paradigm to require that for comprehension of an encrypted message, at least two keys are required, with all of the predefined keys being required to decrypt the message, and with no apparent relation between the keys, making prediction of one key part difficult or impossible based on the corresponding other key part(s) and the ciphertext message. Thus, at least three parties must cooperate to transmit a message, the sender, the recipient, and a third party holding a necessary key part. This results in an ability to audit and log communications without giving access to confidential information to the auditor. This also facilitates economic transactions, since the communication of the missing key information provides an opportunity for a mandatory third party accounting.

According to the present invention, the holders of key parts are not equal parties to the transaction. Rather, one party acts as the intended recipient, who must "procure" the remaining private key parts in order to use the information. This procedure allows the entity that transmits the information to be assured that the transmission will be secure, even with respect to a trusted third party, while ensuring that the intended recipient must cooperate with the intended third party. For example, the third party receives a fee or other value for this interaction, and is able to log the identity of the intended recipient and time of the transaction. In many instances, for example access to medical information, this allows a third party to authenticate information requests, apply access rules, and log transactions, on behalf of patients or medical institutions, without itself handling the sensitive information. The health care institution, on the other hand, can achieve compliance with regulations protecting the privacy of medical records while providing portability thereof, without increasing its staff or breaching security protocols. Patients, meanwhile, employ a third party for authenticating requests for medical information, logging access, and implementing various rules and limitations.

Using this scheme, the original ciphertext encryption key and recipient private key need never be disclosed, and thus may each be retained for use over an extended period. The session encryption key, however, will vary with each message.

It is noted that, since the intermediary holds the decryption key for the record, it may, in exceptional circumstances and in cooperation with the repository, decrypt the plaintext message. Therefore, it is seen that, even if a user fails to meet all access rules (one of which may be, for example, the express consent of the patient), the desired information is not lost, locked or completely unavailable. Rather, the trustee may be given the discretion to release the records or to request release of the records during an emergency.

The present system thus may be used in a number of areas. For example, it may be used to transmit confidential medical records through a public network. The (not yet effective) regulations issued pursuant to the Health Insurance Portability and Accountability Act (HIPAA) require that patient medical information be securely transmitted, that access be logged, and that the identity of the recipient be authenticated. However, while secure transmission is relatively easy to perform using modern computing architectures, the logging and authentication require a substantial infrastructure and overhead to maintain. Many institutions would be quite burdened by supporting such potentially labor intensive and infrastructure intensive obligations. Therefore, the present system allows secure access to an institutional database, with the logging and authentication potentially outsourced, to an intermediary. The outside organization, in this case, implements the required security protocols to assure patient data confidentiality both inside and outside the medical institution. The data repository for the medical information may encompass only encrypted information, and therefore implementing an appropriate communications firewall for controlling public access of the database is facilitated.

A trusted entity may provide for controlling external access to an institutional database; however, this trusted entity may also control internal access and logging in like manner. In like manner, the trusted entity may also perform inter-institutional functions, for example where portions of a patient medical record are housed in various institutions. According to the present invention, the degree of trust required of an intermediary may be less than that required of either a key escrow agent or a repository with complete access to the private information. While the intermediary entity may have access to certain tertiary medical record information, such as the existence of records and identity of those accessing the records, the primary records may remain secret, even with respect to this intermediary entity. The intermediary system may incorporate a directory of patient records, assisting an authorized user in obtaining various records.

It is noted that, while medical records are retained by a custodial institution, the corresponding patient retains important rights therein. Thus, the present system may be expanded to provide the patient with a key portion, which is also required for access to the records. In this case, since the patient's consent will not always be available in a timely manner when the record is needed, a key escrow or key recovery scheme may be implemented for this key portion. This may be implemented in known manner, but preferably it is maintained by the trusted entity, since this will make any such recovery transaction more efficient.

In order to increase portability, physical records, especially archives, may be stored physically or logically outside the source institution. Thus, limitations of access and bandwidth imposed by a public network gateway for an institution do not impede information transfer. Authorizations, as distinct from the information sought to be communicated, are verified on-line, and may involve access to the source institution, but typically command substantially lower bandwidth requirements.

Current medical records are subject to at least two important controls exerted by the patient: The patient can restrict access to the record, and the patient may demand access and a copy of the record. These two rights, together very much define a type of property interest. Since the trusted entity acts as a gatekeeper to the records, it may also act as an agent or trustee for the patient, exercising access rules and the like, by way of the required keys. Thus, it may be considered that the key(s) and possibly other data held by the trusted entity is in trust for the patient. The intermediary may adopt a business model either directed to serving the needs of the medical institution(s), the patients, or both.

The trust model for the access privileges allows the trustee leeway under existing legal principles to act on behalf of the beneficiary (in accordance with the authority granted at the time the trust was created or in effect at the time of the access request), who in the case of medical records is the patient. Further, it provides a framework in which courts may provide guidance and/or mandate to the trustee. Thus, in contrast to a typical contractual relationship, the trustee of the access rights to the medical records stands in a different position than a mere party to a contract.

In alliance with this trust model, the intermediary is in a unique position to act as a health care proxy and an executor of a living will for patients. In this model, the patient provides a living will or other instructions to the intermediary. When the patient is unavailable and a decision must be made, the intermediary can search its database for a most current instruction or rule authorized by the patient, and provide an authenticated communication to the health care provider communicating the patient's wishes. For this service, the intermediary may charge a fee, for example a yearly maintenance fee, a per transaction fee, and/or statutory or court-awarded fees.

A potentially significant use of existing medical records is in conjunction with a data mining system. This is because it is generally considered quite expensive to capture medical records, remove patient-specific identification, and place the resulting anonymous records in a database. On the other hand, as the use of electronic medical records and intelligent means for extracting anonymous data from medical records grows, this data will become more accessible. The present system provides an infrastructure for amassing, maintaining and exploiting the value of this data. Thus, by filtering data, obtaining filtered data, or hosting an index to anonymous data, the present intermediary provides a resource to facilitate use of medical data. For example, third party payors may seek to determine the standard of care or best practices for a given patient, in the context of authorization of payment for a procedure. Likewise, a health care professional may seek to determine a patient prognosis. By providing an accessible system that links data for a specific patient, with anonymous data for a plurality of patients with potentially similar medical issues, significant efficiencies may result. Such a system including anonymous data could be established separately from the private medical record database system. The intermediary system according to the present invention may provide authentication and accounting system for the use of such anonymous data, as well.

The intermediary may be compensated by the user, which must negotiate to obtain the required key(s), or otherwise gain access to intermediary internal databases, by the medical institution, which outsources the burdens of administering access to its medical records, by the patient or by a third party payor, who ultimately benefits from the use of the records, or a combination or subcombination thereof. The data repository may also compensate the intermediary for the access services.

Another application for the intermediary system for distributing the encryption key lies in the entertainment industry. In particular, many forms of entertainment, including music, videos, and the like, involve massive data files, ranging from 500 kB to multiple gigabytes of data. One solution proposed for the delivery of such data streams is called a peer-to-peer architecture, wherein the hosting of information is distributed over the population of users of the information. Thus, any user seeking information can communicate with another user (or a set of users) seeking to transfer the information. Since the Internet provides a highly redundant and distributed communications network, the capacity of the network is large and the incremental cost of adding a new work to the distributed database is low.

However, typically, the owners of entertainment works seek to maintain control over use of the works and seek to receive compensation for their transfer and/or use. Therefore, the present system allows the work to be locked or encrypted, wherein the owner of the work or its agent serves as a third party to the communication, and provides the recipient with a dedicated decryption key for use of the work upon accounting therefore. Thus, the recipient is not dependent on a single connection to a host server to obtain the work, and the owner of the work need not invest in maintaining massive file server. This reduces the transaction and infrastructure costs to the owner, which are generally a high percentage of the overall costs in the delivery of electronic media programs. The system may also provide compensation to the host (repository) for allowing use of its resources.

The system operates as follows. Each user is provided with a customized application that manages local files. Each local file is registered with an external server. A user seeking to obtain a copy of a file queries the external server to find appropriate copies residing on the network. Either automatically or manually, the requesting user initiates a transfer of the file through a communications link from another "peer" user. This communication is encrypted, so that no eavesdropper can misappropriate the file, and the intended recipient accounts for its receipt. The decryption key is defined such that a portion is dependent on the identity of the recipient, and a portion provided by or on behalf of the owner of the content. This latter key portion is typically provided only after an accounting, such as a payment for the use of the file. The host for the file encrypts the file using a public key or set of public keys for the recipient and owner. These keys, of course, may be the respective trustee keys defined by Micali, or according to another appropriate encryption scheme. The host for the content may be compensated for use of its system, thus encouraging use within the rules of the system, rather than circumventing the system.

According to one embodiment, in order to prevent users from circumventing the system, the user's public key, and/or the owner's key, may also be embedded as part of a watermark or embedded signal that must match a user's access system. When the embedded data matches, the system operates normally. In the case of a mismatch, it will not operate. The application software at the host converts the embedded signal between that user's and the new user's. In order to prevent circumvention, each user system may periodically report to the intermediary its own "serial number" and possibly the file usage. A user credit card or other financial guaranty may also be obtained to automatically compensate for any usage.

The present invention allows for the distribution of data from a repository, which does not require the repository to be trusted with the data. Thus, encrypted data may be transmitted, replicated, and cached to the benefit of an owner of rights in the data, since the data is not usable without an encryption key. Such data may be, for example, consumer media or multimedia works, which advantageously are subject to caching by edge servers for efficient utilization. According to the present invention, and in contrast with prior methods, in order for a data record to be used, a separate accounting and authentication transaction is required, and the data record transmitted to the user is presented in a format that requires a custom-generated cryptographic key. Thus, the data remains secure during archival storage and transmission. In order to limit the ability of an authorized recipient from retransmitting the record data, the data may be "fingerprinted" or watermarked to the user or its computing hardware based on the transcryption operation at the data repository (or remote key handler, if present). This fingerprinting allows either tracking of unauthorized transmission, or preventing the use of the record data on different systems or by different users.

As used herein, the phrase "comprehension functions" encompasses both cryptography and steganography. Thus, secret information is required in each case in order to comprehend certain information. In the former case, the information is scrambled, and must be decrypted, while in the later case, it is hidden, and must be located. It is, of course, possible to combine the techniques and employ hidden and scrambled messages. it is also noted that, in some instances, it is not necessary to apply a comprehension function to all of a the information in a message. For example, in the case of medical data, it is often the maintenance of security of personally identifying aspects that is sought. Therefore, often only the personally identifying information needs to be selectively obscured. Likewise, in the case of entertainment media, it is possible to selectively degrade the information by selecting only a portion of the media information to selectively obscure, which makes the resulting information significantly less valuable. By selectively applying such a comprehension function only to a portion of the information, substantial computational resources may be conserved or spared.

According to another embodiment of the invention, the transcryption scheme according to the present invention may be employed to securely communicate cryptographic codes between parties to a communication, for example a symmetric encryption key. For example, the Advanced Encryption Standard (AES) employs the Rijndael algorithm, which may provide high efficiency encryption and decryption. Thus, the asymmetric key encryption may be directed principally toward key exchange.

According to another embodiment of the invention, an encrypted message (ciphertext) is "transcoded" from a first encryption type to a second encryption type, without ever passing through a state where it exists as a plaintext message. Thus, for example, an intermediary to the transaction who negotiates the transaction, need not be privileged to the information transferred during the transaction. In the case of medical records, therefore, thus means that the intermediary need not be "trusted" with respect to this information.

A preferred embodiment of the invention provides composite key asymmetric cryptographic algorithms to, among other advantages, avoid revealing a plaintext message during intermediate processing. However, it is also possible to employ symmetric key cryptography, especially since the remote key handler is a privileged environment, and may be provided with sufficient security to abate the risk of message disclosure. Further, in some embodiments, the system risks attendant in releasing both the permanent encryption key along with the ciphertext are insubstantial, and therefore a transcoding or transcryption process is not required. These various embodiments are encompassed by the present invention.

As an example of the algorithm according to the present invention, p=61 and q=53, n=pq=3233.
(e*d)=1 mod ((p−1)(q−1))
choosing e1=23 results in d1=407;
choosing e2=101, d2=1421.

Selecting an arbitrary message text 1111, the function $C=M^{e1 \cdot d2}$ mod n results in the equation:

$$C=(1111)^{23*1421} \mod(3233)=2758 \mod(3233).$$

To invert this encryption with ciphertext 2758, $M=C^{e2 \cdot d1}$ mod n, resulting in the equation:

$$M=(2758)^{101*407} \mod(3233)=1111.$$

Thus, it is seen that the algorithm according to the present invention is operative to encrypt and decrypt the message, with a composite key that is relatively large, and thus difficult to determine the respective factors.

DETAILED DESCRIPTION OF THE PREFERRED EMBODIMENTS

Figure 1:
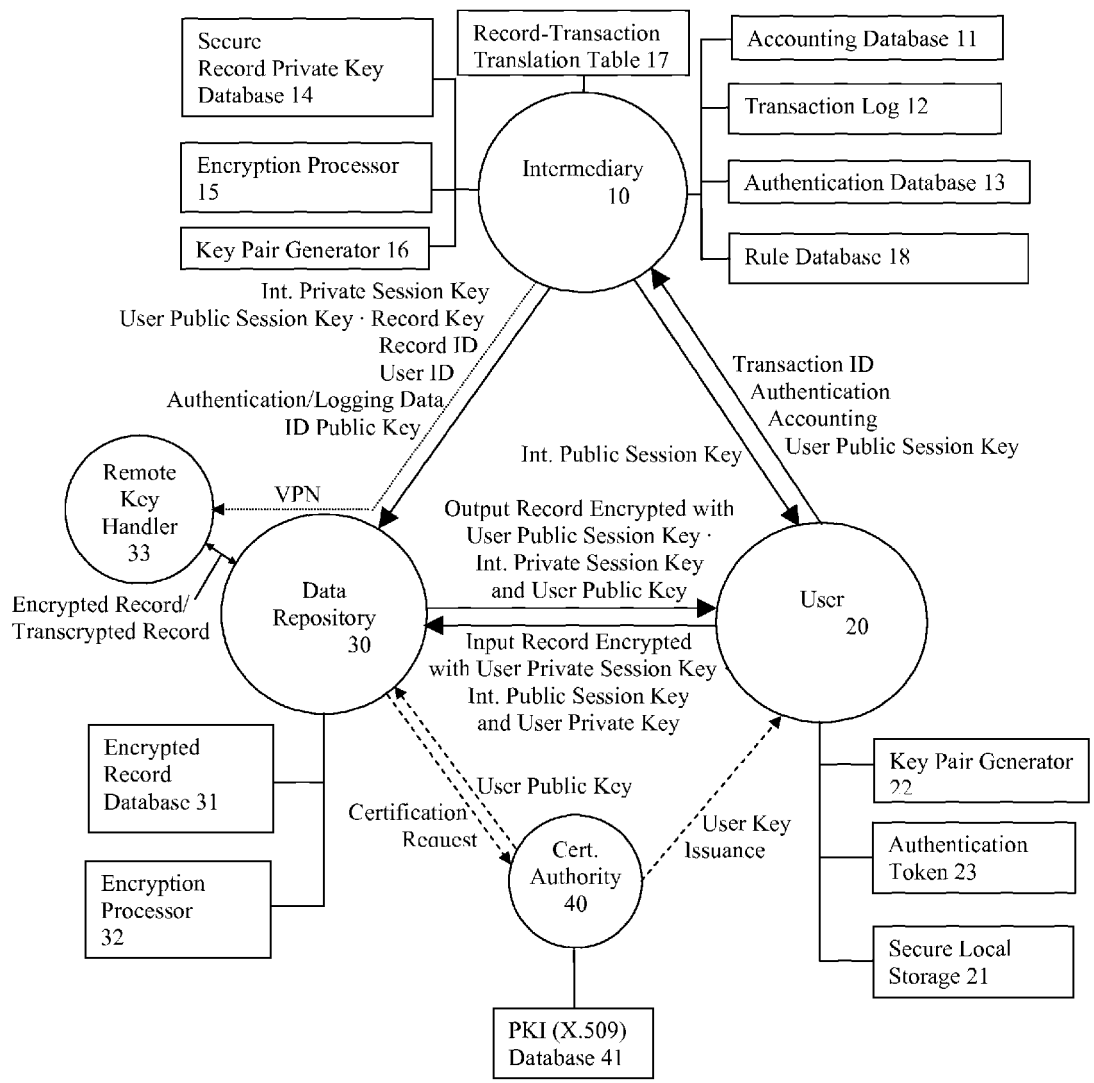
FIG. 1 shows a block diagram of a first embodiment of the communications system according to the present invention.

The present invention provides a transaction scheme involving at least three parties for communication of a message, in which all parties are required, yet only one party, the intended recipient or User, is trusted with the message.

The following identities characterize the known RSA algorithm: $C=M^d$ mod n and $M=C^e$ mod n. For the complete transformation, the relationship is as follows: $M=C^e$ mod $n=(M^d)^e$ mod n. According to the present invention, it is desired to transform ciphertext 1 (C1) into ciphertext 2 (C2), in a secure manner without ever revealing the plaintext message during the process. In order to achieve this transformation from C1 to C2, the two-step process is concatenated. Thus, the decryption according to a first decryption key $M=C1^{e1}$ mod n and the reencryption according to a second decryption key $C2=M^{d2}$ mod n are combined into a single operation, $C1^{e1 \cdot d2}$ mod $n=M^{d2}$ mod n=C2. So long as the factors of e1·d2 remain secret, it is infeasible to factor thus number, and thus this transformation inherits the advantages of the RSA encryption scheme. Thus, the plaintext message remains secure through this transformation. In fact, because the transformation is integral, relatively low security is required for the starting and transformed ciphertext, and the crypto-processor itself.

This process also lends itself to three (or more) party transactions, wherein each party is a required participant (maintains secret information necessary for the communication) but only an intended recipient (User) has access to the plaintext message.

Accordingly, if a transaction intermediary supplies a transcoding or transcryption key to the message Repository, having two secret components (so that the composite key may not be factored), an existing ciphertext may be transformed into a new ciphertext. While the components of the composite transcode key are secret, due to the nature of public key systems, these are insufficient for the intermediary to gain access to the message. The two secret components include a key specific for the User, and a key specific for the existing encryption of the message ciphertext. The resulting transformed ciphertext is therefore a public key encrypted message for the User, which can only be decrypted with the User's private key. In order to maintain the security of the original message against subsequent uses, it is preferred that the User public key-private key pair be a session key, that is, accounted for and used only for the single transmission and subsequently discarded. The "public" portion of the session key pair is transmitted by the recipient to the intermediary, which is held in secrecy and multiplied by the private key for the existing ciphertext message. In this way, the intermediary has no knowledge of the "private" session key, and cannot itself intercept the communication.

Thus, the data repository handles only encrypted messages according to the present scheme. The decryption key for these messages is held secretly by the intermediary only, and neither released nor transmitted in a form subject to decomposition.

The intermediary, while holding a sufficient decryption key, has no access to the Repository ciphertext message, which is separately maintained by the Repository.

The User receives a ciphertext message, which is decrypted with a secret key. Typically, the Repository will further encrypt the transmission to the User with a permanent-type public key for that User, which will be obtained from or verified by a separate certification authority. Thus, even if the intermediary were to employ a dummy key, the resulting transmission from the Repository would still be secure with respect to the intermediary.

In operation, the User generates on a session basis, a key pair, and provides one portion to the intermediary, the other is maintained in secrecy for the duration of the transaction. The intermediary receives the session key and multiplies it with the secret decryption key for the message held by the Data Repository. Both the session key and the decryption key individually are held in secrecy by the Intermediary. The Data Repository further receives from the Intermediary an identification of the User, which is used to query a certification authority for an appropriate public key. The Data Repository "transcrypts" the encrypted message with a composite key (resulting from the multiplicative combination of the Record Public/Private Key, the User Public Session Key and the Intermediary Private Session Key) as well as the User (persistent) Public Key to yield a new encrypted message, which is transmitted to the User. The User then applies the retained portion of the session key, as well as a persistent private key, resulting in the original plaintext message. Likewise, the composite encryption key used by the Data Repository results from the combination of the secret encryption key, Intermediary Private Session Key, and User Public Session Key.

When data is added to the Encrypted Record Database 31, it may be advantageous to provide the User 20 with a confirmation comprising a hash function performed on the received data, either in its Composite Session Key format (allowing immediate verification by the User 20) or in its Record Key format (allowing persistent verification of the transaction), or both. Further, it may also be advantageous for the Intermediary to receive or act as conduit for these verification communications, allowing an accounting to take place on such confirmation.

When data is communicated from the Encrypted Record Database 31 to a User 20, it may likewise be advantageous to provide the Data Repository 30 with a confirmation comprising a hash function performed on data received by the User 20. This confirmation may advantageously be communicated through the Intermediary, allowing an accounting to take place on such confirmation.

Example 1

The transactional details are now described with respect to FIG. 1. While there are three particular parties to the process, the User 20, the Data Repository 30, and the Intermediary 10, a fourth party, a Certification Authority 40 is also generally involved. It is also noted that, while the process shown in FIG. 1 generally provides a communication flow of information from the Data Repository 30 to the User 20, this communication stream may also be reversed, allowing the User 20 to upload information to the Encrypted Database 31 of the Data Repository 30, using a set of User 20 and Intermediary 10 Session Keys and the User 20 Private Key. At the Remote Key Handler 33, the encrypted message is transcrypted with the Record Public Key, securely supplied by the Intermediary 10 through a virtual private network-type arrangement through the Data Repository 30.

The User 20 initiates the transaction by contacting the Intermediary 10, which typically maintains an Accounting Database 11, a transaction log 12, an Authentication Database 13, and a Secure Private Key Database 14. The accounting function is typically a financial transaction, wherein the User 20 pays for the information requested. Other forms of accounting are also possible, and indeed, the User 20 may be paid for its review of the information. Particulars of each transaction are typically recorded in the Transaction Log 12, which may be used for auditing, reconciliation, verification, trend analysis, or other purposes. This log potentially allows subsequent aspects of a transaction to be anonymous, with the identifier of the User 20 stripped, while verification of authenticity may continue to be assured through use of an authentication token 23.

The Authentication Database 13 may, for example, provide a means for definitively identifying the User 20, and/or, in the case of a medical record, the identity of the patient who consults the User 20, who is, for example, a health care professional. This identification may be based on a Public Key Infrastructure, biometric identifiers, passwords and/or personal identification numbers (PIN), or other known means. The Intermediary 10 may therefore provide a persistent association of the User 20 and/or a patient in its records, which facilitates accounting, application of rules, recalling of data from a database, etc.

Advantageously, a medical patient may employ a public key to identify him or herself. This public key is then received by the User 20 as partial evidence of authority and association with the patient. Such keys may expire periodically, preventing persisting use of outdated keys. The Intermediary 10 may then partially authenticate the User 20, by analysis of the patient public key-signed transmission from the User 20 with respect to a patient private key retained by the Intermediary 10. In some implementations of the invention, a patient-specific key pair may be used generally as a Record Encryption Key (e.g., the Record Public Key) for records belonging to that patient in the Encrypted Record Database 31. Generally, this key pair is not identical to the patient key pair used for digital signatures by that patient. It is noted that the Record Public and Private Keys stored in the Secure Record Key Database 14 may, but need not be individually generated for each record added to the Encrypted Record Database 31, and in fact may advantageously be aggregated and a single set of Record Keys used for a single patient or a group of records relating to the same patient, such as a single hospital admission.

The User 20 typically authenticates itself with the Intermediary 10, although in certain instances anonymous or semi-anonymous transactions may be supported. Thus, the Intermediary 10 may serve as a form of proxy to blind transactions while providing security. In the case of medical records, for example, a complete authentication of the User 20 is performed, using any of a variety of means. For example, biometric methods, images, personal identification numbers (PIN) and passwords, alone or in combination with security tokens, such as the SecureID® card token, may be employed. The particular level of authentication and the means employed are not a critical aspect of the invention, and therefore the most appropriate means may be selected. Indeed, the Intermediary 10 may support a plurality of authentication schemes, while it may deliver to the Data Repository 30 merely an indication of a successful authentication process.

The Intermediary 10 may impose a set of access rules, stored in the Rule Database 18. These rules, for example, define which Users 20 may access which types of Records.

The Intermediary 10 does not normally hold encrypted information records for two reasons. First, this defeats the three-party security scheme and might compromise the security of the records themselves, and second, this often means replicating and transporting potentially large databases. Rather, the Intermediary 10 provides transactional support for the Data Repository 30, performing a number of tasks that are potentially burdensome. For example, in some instances, the User 20 will require exception processing. For example, in the case of a physician, normally a patient will specifically authorize transmission of a medical record, and therefore highly automated processing may be employed. In emergency situations, however, direct confirmation of physician or patient authorization may not be possible. In this case, often a manual authentication process will ensue. Likewise, in some cases, a User 20 will fail a biometric test or otherwise not have a required piece of information or security token 23. Likewise, some Users 20 will be automated devices, which may employ special automated authentication protocols. A means is therefore provided for graceful recovery from these situations through exception processing, which may include manual intervention. Thus, this transactional burden may be shifted from the Data Repository 30 to the Intermediary 10.

During an emergency request for authorization, for example where a physician is properly authenticated as the User 20, but the associated patient is unavailable for authentication or authentication is otherwise not possible, the system provides an emergency override mode of operation. In the case of record inputs to the system, the proffered record is assigned a default set of access privileges, and flagged as being an emergency (unauthenticated) record. Later, this record can be fully authenticated, and a specific set of access privileges assigned, when the patient is available, and the emergency flag removed.

When information is requested from the system in the absence of a complete patient authentication, the role of the physician is analyzed for consistency with the nature of the request. A restrictive set of access privileges may be applied, limiting access to only those records originally determined or coded to be "critical", which indeed may have both temporal and contextual sensitivity. Further, the nature of the emergency is analyzed, in addition to the role of the requestor, to further restrict the information available. A personal communication may be initiated to allow a discretionary decision to be made. The accounted transaction fee may take into consideration the costs of authentication and verification; risks borne by the Intermediary or others; and the emergent nature of the requests. Thus, one embodiment of the present invention provides an insurance or indemnity accounting fee for consummating an information transaction.

The Intermediary 10 receives from the User 20 four (or more) pieces of information. As discussed above, the accounting and authentication information are provided. In addition, an identifier of the information sought (or to be transmitted) is also communicated. This is represented in FIG. 1 as the Transaction ID, and typically includes particulars of the record, e.g., patient identification in a medical record system, etc. The Intermediary 10 translates a portion of the Transaction ID into a Record ID, using a Record-Transaction Translation Table 17. The Transaction ID may also include other particulars of the transaction. Finally, the User 20 maintains a public key encryption Key Pair Generator 22. This Key Pair Generator 22 generates a Session Key pair, of which one component is maintained by the User 20 in secrecy, and the other component is transmitted. The User 20 also maintains a Secure Local Storage 21 system, for example for receipt of the private information and to store decryption information, such as the private portion of the key generated by the Key Pair Generator 22.

In a medical environment, the Intermediary 10, as part of the authentication, verifies that the User 20 has an appropriate set of rights to receive the requested information, in a role-based authentication scheme. It is also possible for this "role" information to be passed to and processed by the Data Repository 30, since an access privilege database may not be maintained by the Intermediary 10, and itself might include sensitive information.

The Intermediary 10, after authenticating the User 20, and accounting and logging the transaction, processes the User 20 Public Session Key by internally multiplying this with an Intermediary Private Session Key, generated by the Key Pair Generator 16 and a Record Private Key maintained in a Secure Private Key Database 14. The resulting value is then transmitted, along with the record identification, User identification, and appropriate authentication and transactional logging data, to the Data Repository 30.

In some instances, the User 20 authentication may include an associated identifier, for example a Patient-specific Public Key (ID Public Key) in a medical record system, which allows an additional or substitute layer of security. In addition, a patient could himself act as a User 20, seeking access to his own medical records.

In one scenario, the Data Repository 30 receives the information from the Intermediary 10, and recalls the identified record from an Encrypted Database 31. The database record remains encrypted with a Record Public Key (e3), originally generated by the Key Pair Generator 16. The Record Public (e3) and Private Keys (d3), in this case, is stored in the Secure Record Key Database 14. An Encryption Processor 15 may be provided to carry the cryptographic processing burden of the Intermediary 10, for example implementing a secure socket layer (SSL) protocol. The encrypted database record from the Encrypted Record Database 31, is presented to the Remote Key Handler 33, a privileged processing environment having both high security and substantial cryptographic processing capacity. The Remote Key Handler 33 implements the algorithm:

$$C1 = C2^{d1 \cdot d2 \cdot d3} \bmod n,$$

wherein d2 e1 f1 is:

User Public Session Key (e2)*Intermediary Private Session Key (d1)*Record Private Key (d3), C2 is the ciphertext message stored in the Encrypted Record Database 31, encrypted with the Record Public Key (e3), and C1 is the ciphertext message in a transcrypted format for transmission to the User 20. This processing is performed in the Remote Key Handler 33, based on information from the Intermediary 10 transmitted through a communications channel. This communications channel is preferably secure, such as a virtual private network. The Remote Key Handler 33 is preferably physically proximate or part of the Data Repository 30.

The Data Repository 30 also receives a message intended for it from the Intermediary 10, and may log the transaction using the supplied information. The Data Repository 30 further employs the User Identification to query a Certification Authority 40, maintaining a Public Key Database 41, in order to retrieve a persistent User Public Key. This User Public Key is then further employed by the Encryption Processor 32 to encrypt the Record for communication to the User 20.

In another scenario, the User 20 transmits a Data Record to the Data Repository 30. In this case, the Data Record is encrypted with the User 20 Private Session Key, the Intermediary 10 Public Session Key (received from the Intermediary during a handshaking communications), as well as the User 20 Private Key corresponding to the certificate stored by the Certification Authority 40 in the public key database 41. The Data Repository 30 then receives the communication, first decrypts it with the User Public Key received from the Certification Authority 40 from the Public Key Database 41 in the Encryption Processor 32, and then passes it to the Remote Key Handler 33, with a securely received User Public Session Key Intermediary Private Session Key Record Public Key product received from the Intermediary 10, to produce a transcrypted Data Record, encrypted with the Record Public Key, which in this case is generated by the Intermediary 10 in the Key Pair Generator 16. This Record (encrypted with the Record Public Key) is then passed to the Data Repository 30 and stored in the Encrypted Database 31.

It is noted that in anonymous communications, a proxy may be employed to blind the address of the User 20 from the Data Repository 30. In this case, a modified scheme is employed which may not use a Certification Authority 40, although the Intermediary 10 may provide anonymous certificate services.

It is also noted that each communication channel may itself be secure, for example using 128 bit secure socket layer (SSL) communications or other secure communications technologies. In particular, it is important that only the Intermediary 10 be in possession of the transcryption key (e.g., composite key) and the session key (e.g., Intermediary Private Session Key), since this will allow recovery of the private encryption key.

As noted above, the release of private keys may be limited by having both the Intermediary 10 and User 20 to each generate a session key pair. In this case, the Intermediary 10 transmits the public portion of its session key pair to the User 20, which is then employed to decrypt the message from the Data Repository 30. The key provided by the Intermediary 10 to the Remote Key Handler 33, in this case, is the product:

Record Private Key User Public Session Key Intermediary Private Session Key. The resulting transcrypted record from the Data Repository 30 is encrypted with the product of the two session keys. Because the transmitted key is a triple composite, the Record Private Key is protected against factorization. The User 20 then uses the User Private Session Key and Intermediary Public Session Key in order to decrypt the Data Record.

In the case of a Data Record transmission from the User 20 to Data Repository 30, the User 20 transmits a record encrypted with the product User Private Session Key Intermediary Public Session Key Intermediary 10 transmits to the Remote Key Handler 33, the product:

Public Record Key User Public Session Key Intermediary Private Session Key which is used to transcrypt the encrypted Data Record with the Public Record Key.

In like manner, the Data Repository 30 may also generate a session key pair, used to sign and authenticate transmissions.

It is therefore seen that, by advantageously using the property of multiplicative identity of modulo arithmetic and the difficulty in factoring large semi-prime numbers, useful additions to the RSA encryption scheme are obtained. These additions allow secure third party involvement in communications, and the substitution of encryption keys without directly passing through a plaintext state.

Example 2

Figure 2:
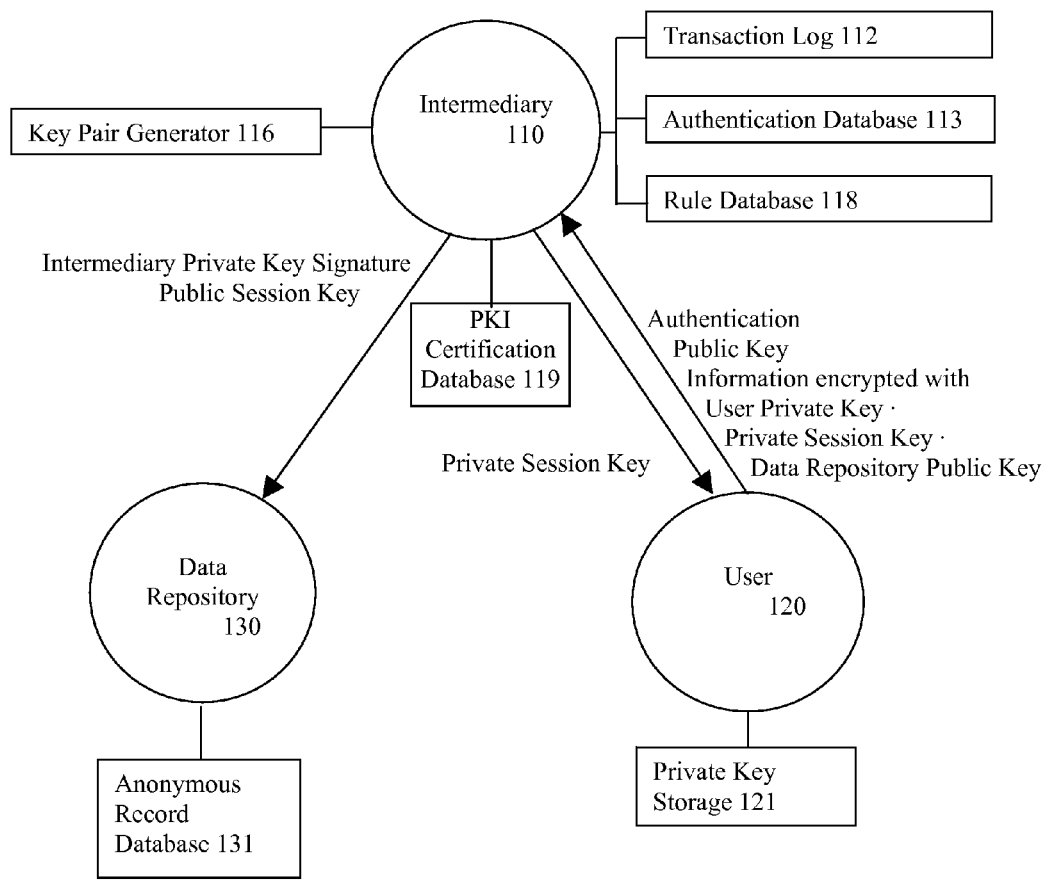
FIG. 2 shows a block diagram of a second embodiment of the communications system according to the present invention.

The transactional details of a second embodiment of the invention are now described with respect to FIG. 2. FIG. 2 is similar to FIG. 1, with a number of simplifications, and notably, an absence of a direct communications path between the User 120 and the Data Repository 130. This allows an anonymous communication through the Intermediary 110 as a proxy.

As shown in FIG. 2, the User 120 transmits a datastream to the Intermediary 110, which includes authentication information, the User's public key, and a message encrypted with:

User Private Key Private Session Key Data Repository Public Key

The Intermediary 110 resorts to its Authentication Database 113, PKI Certification Database 119 and Rule Database 118 to verify the authority and access privileges of the User 120. The transactional details are stored in the Transaction Log 112. During the initial communication between the User 120 and Intermediary 110, the Intermediary 110 generates a Public and Private Session Key pair in the Key Pair Generator 116, and transmits one portion to the User 120.

The Intermediary 110 then transcrypts the message transmitted by the User 120 by performing an RSA type decryption operation on the message using the User 120 Public Key, effectively removing personally identifying information from the message while assuring the authenticity and authority of the User 120. The anonymous message is then transmitted to the Data Repository 130, which may then decrypt the message using the other portion of the Session Key (provided by the Intermediary 110) and its own Private Key.

Example 3

Figure 3:
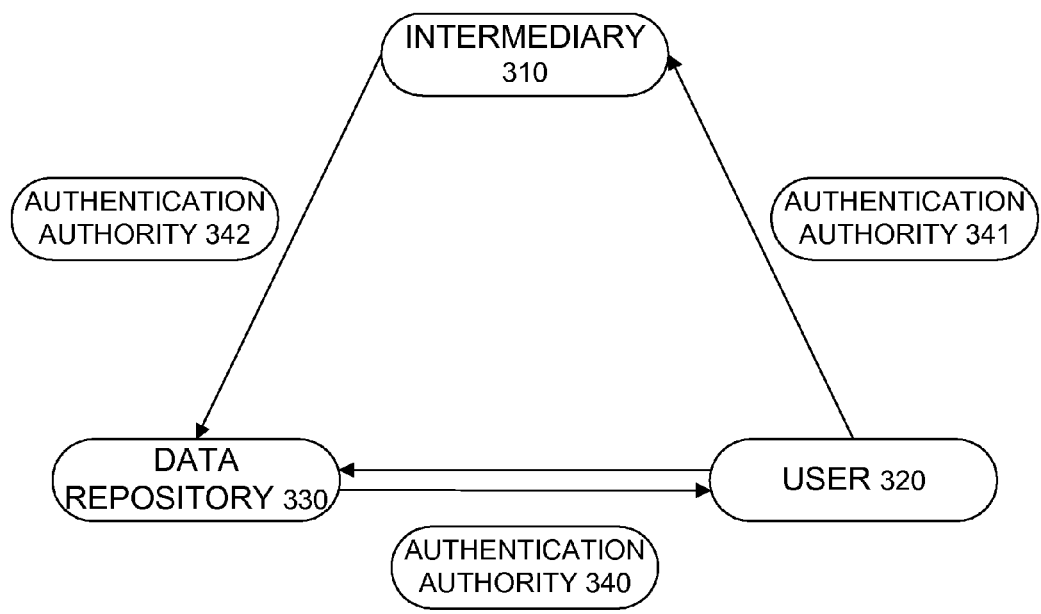
FIG. 3 shows an idealized representation of a three party communication transaction according to the present invention.

FIG. 3 shows a simplified generic schematic arrangement for a three-party transaction. In FIG. 3, three parties are involved in communication of a message. Separate authentication authorities, may serve as traditional certification authorities in a public key infrastructure, or may provide greater or lesser services to respective parties, or may be integrated within one or more of the three integral parties. FIG. 3 shows that the User 320 communicates message set-up information with the Intermediary 310, in a communication in which the authenticity of the parties may be verified by Authentication Authority 341. The Intermediary 310 correspondingly communicates message set-up information to Data Repository 330, in a communication in which the authenticity of the parties may be verified by Authentication Authority 342. Finally, the Data Repository 330 and User 320 conduct an encrypted communication in either direction based on the set-up information, in a communication in which the authenticity of the parties may be verified by Authentication Authority 340. If the Data Repository 330 initiates the communication, the flow paths are reversed. The Intermediary 310 is not a party to the communication proper, and has insufficient information to eavesdrop on the encrypted communication. In a generic case, a mere Diffie-Hellman type key exchange between the User 320 and Data Repository 330 would be sufficient; however, according to an aspect of the present invention, the Data Repository 330 and Intermediary 310 operate under mutual distrust to prevent release of a secret, which can only be transmitted for decryption to the User 320. The Intermediary 310 holds the decryption key for the secret, while the Data Repository 330 holds the encrypted information. The communication set-up information therefore provides a scheme in which the Intermediary 310 passes a composite transcryption key to the Data Repository 330, which includes as masked components the decryption key for the encrypted message, as well as a new session encryption key, for which the User 320 holds the corresponding session decryption key. Thus, neither the Intermediary 310 nor the Data Repository 330 ever possesses sufficient information to obtain message in decrypted form.

The Authentication Authorities 340, 341, 342 provide means for independent assurance that each party to the communication is the intended party, thus limiting the ability of any one party from undermining the security of the scheme. On the other hand, the ability of two parties to act together and in cooperation to obtain the secret message serves as a feature to allow recovery of the secret message in case of emergency.

Example 4

Figure 4A:
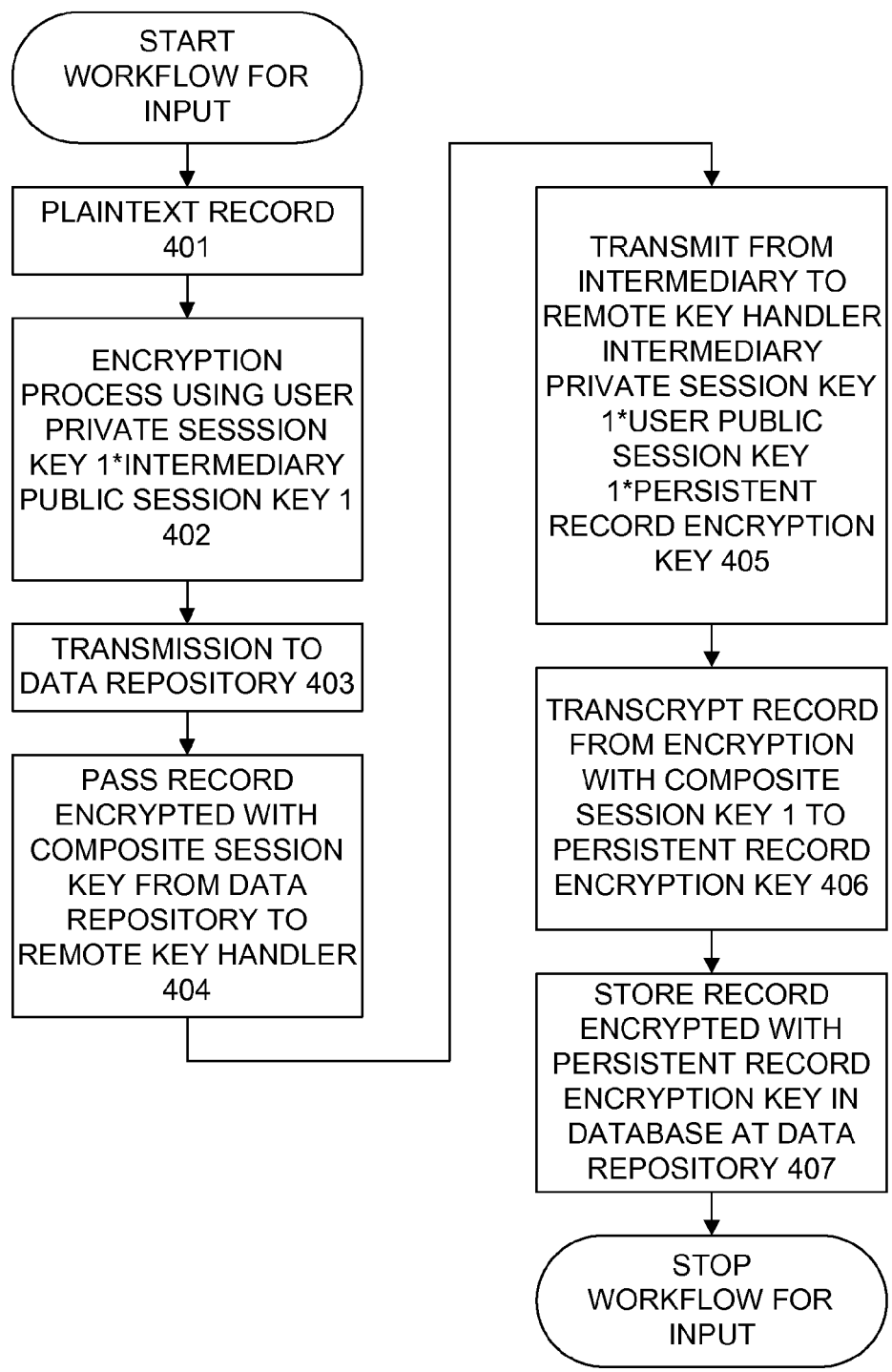
FIGS. 4A and 4B show workflow diagrams for the input and output of encrypted records according to the present invention.

FIG. 4A shows a workflow diagram for the input of encrypted records by the User 20 with respect to the system of the Data Repository 30. Initially, a Plaintext Record 401 is encrypted by the User 20 in a process 402 using the User private session key 1*Intermediary Public Session Key 1. The User 20 generates the User Private Session Key pair and receives the public portion of the Intermediary 10 Session Key communicated in the set-up communication. A message is then sent 403 from the User 20 to the Data Repository 30, including the record encrypted with the composite (product of two or more PKI keys having the same modulus) session key 1 (User Private Session Key 1*Intermediary Public Session Key 1). The Data Repository 30 passes 404 the encrypted record to the Remote Key Handler 40. The Intermediary 10 then communicates 405 the Intermediary Private Session Key 1*User Public Session Key 1*Persistent Record Encryption Key, which is processed 406 in a transcryption process to yield a record encrypted with only the Persistent Record Encryption Key, the other key components having been eliminated. The record encrypted with the record persistent encryption key is then stored 407 in the Record Database 31 at the Data Repository 30.

Figure 4B:
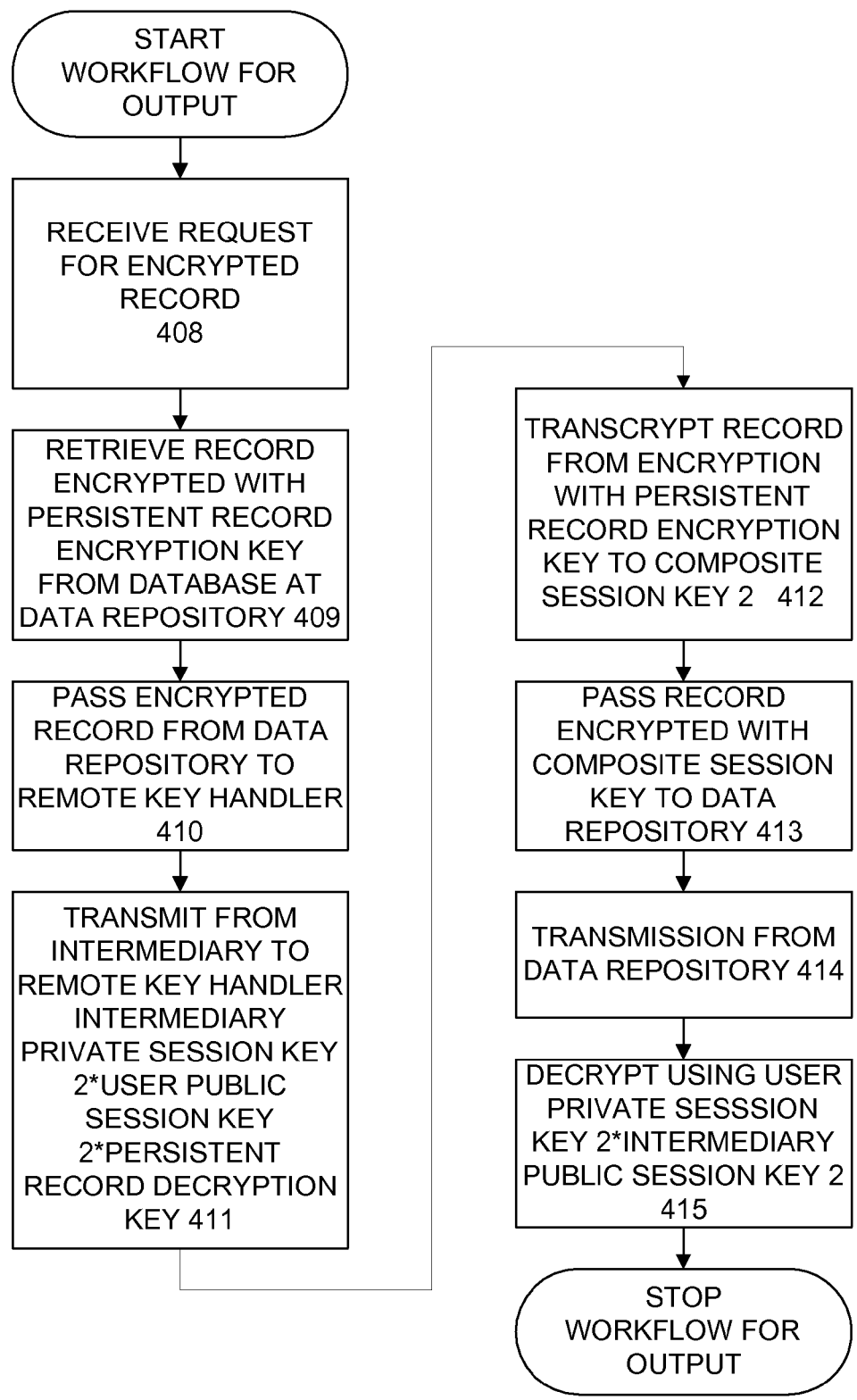

To output the record, as shown in FIG. 4B, an inverse process is followed. A request is received 408 for the encrypted record. The record encrypted with the Persistent Record Encryption Key is retrieved 409 from the Record Database 31 at the Data Repository 30, and passed 410 to the Remote Key Handler 40. The Intermediary 10 then transmits 411 to the Remote Key Handler 33 the Intermediary Private Session Key 2*User Public Session Key 2*Persistent Record Decryption Key. The Remote Key Handler 40 then processes 412 the record encrypted with the Persistent Record Encryption Key with the received key to yield a Data Record encrypted with the Composite Session Key 2 (Intermediary Private Session Key 2*User Public Session Key 2), the Record Encryption Key having been eliminated in the transcryption process, which is then passed 413 to the Data Repository 30. The Data Repository 30 transmits 414 the encrypted Data Record to the User 20, which is then decrypted 415 with the Intermediary Public Session Key 2*User Private Session Key 2, the former having been received from the Intermediary 10 and the later being generated by the User 20 at the beginning of the transaction set-up. The User 20 thus obtains the plaintext record.

Figure 5:
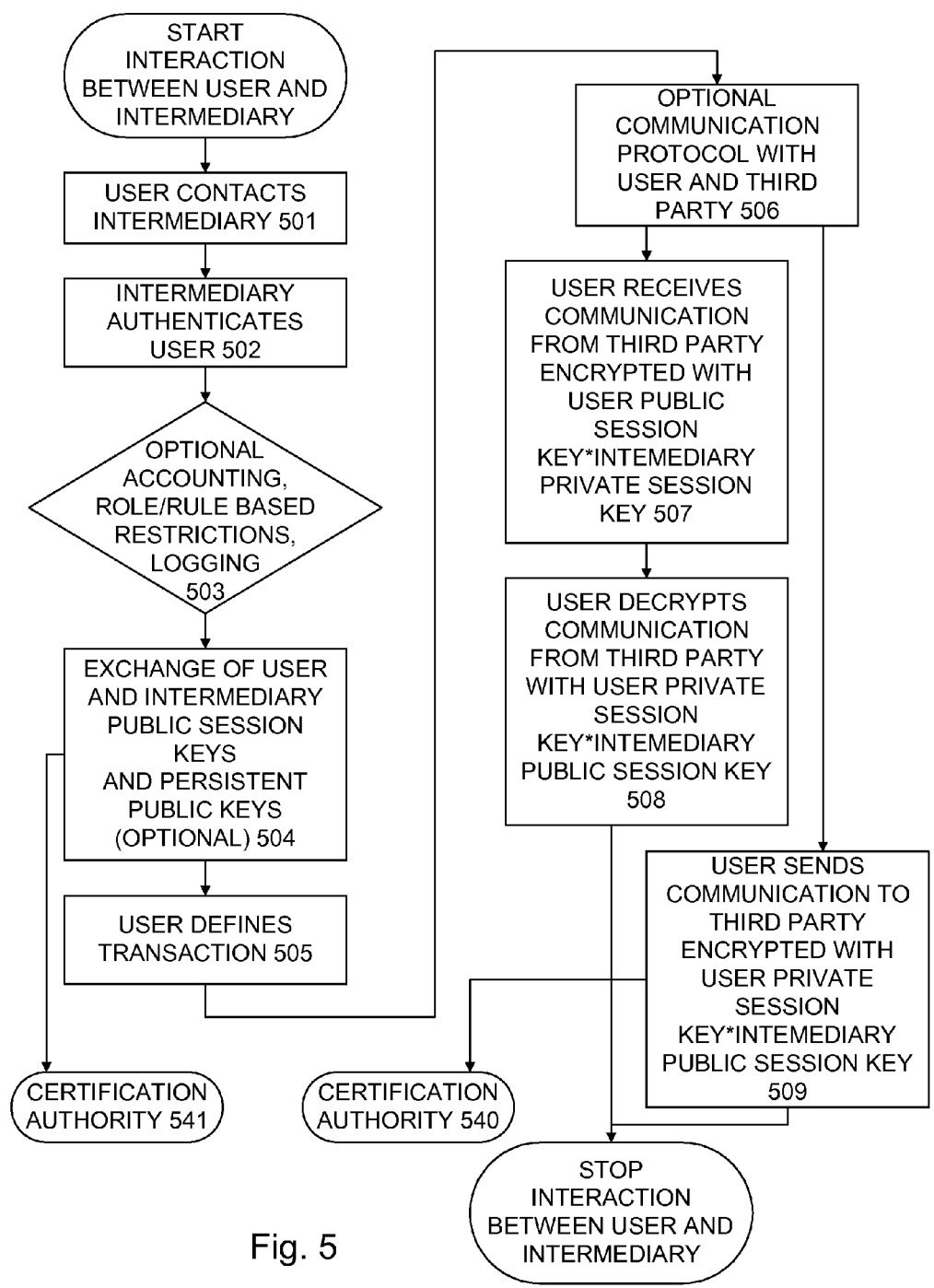
FIG. 5 shows a flowchart of the actions of the user during typical transactions according to the present invention.

FIG. 5 provides a flowchart of the actions of the User 20 during typical transactions. The User 20 contacts 501 the Intermediary 10, and during the ensuing communication the Intermediary 10 authenticates 502 the User 20. After authentication 502, the Intermediary 10 conducts 503 an optional accounting, implements rule and/or role based restrictions, and logs the transaction. The User 20 and Intermediary 10 then exchange 504 public session keys, retaining their respective private session keys. A certification or Authentication Authority 541 may also provide further assurance of the identity of the various parties. The User 20 also defines 505 the nature of the desired transaction, for example uploading or downloading a Data Record. The Intermediary 10 then communicates with a third party, e.g., the Data Repository 30, in steps shown elsewhere.

An optional communication protocol is conducted 506 between the User 20 and a third party, e.g., the Data Repository 30, to establish communication parameters and the like. In the case of a Data Record download, the User 20 receives 507 information from the third party encrypted with the User Public Session Key*Intermediary Private Session Key, and then decrypts 508 the information with the User Private Session Key*Intermediary Public Session Key. In the case of an upload of data, the User 20 sends 509 information to the third party encrypted with the User Private Session Key*Intermediary Public Session Key. The Certification Authority 540 may provide authentication services for communication between the User 20 and the third party.

Figure 6:
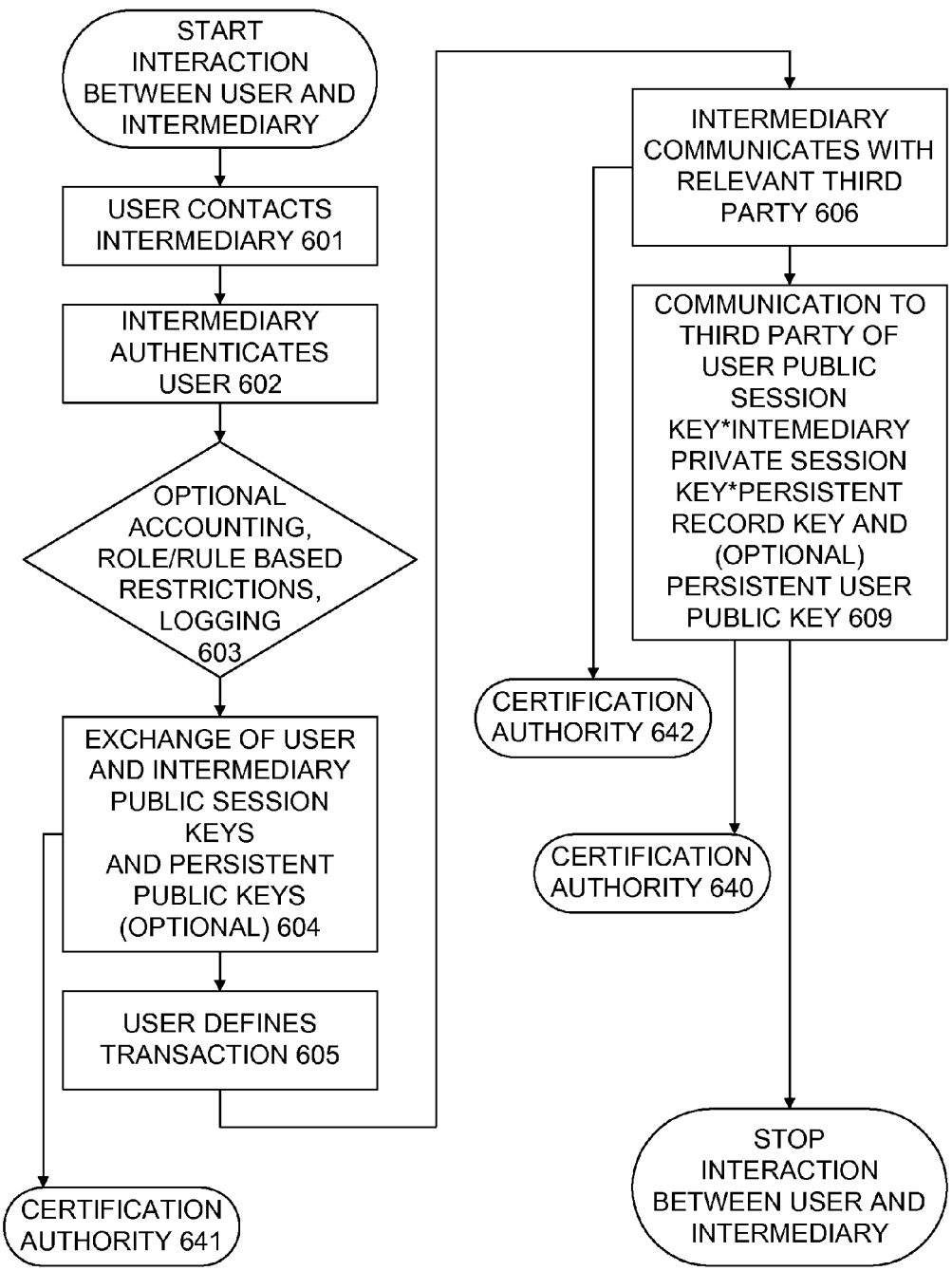
FIG. 6 shows a flowchart of the actions of the intermediary during typical transactions according to the present invention.

FIG. 6 provides a flowchart of the actions of the Intermediary 10 during typical transactions. The User 20 contacts 601 the Intermediary 10, and during the ensuing communication the Intermediary 10 authenticates 602 the User 20. After authentication 602, the Intermediary 10 conducts 603 an optional accounting, implements rule and/or role based restrictions, and logs the transaction. The User 20 and Intermediary 10 then exchange 604 public session keys, retaining their respective private session keys. A certification authority or Authentication Authority 641 may also provide further assurance of the identity of the various parties. The User 20 also defines 605 the nature of the desired transaction, for example uploading or downloading a Data Record. The Intermediary 10 then communicates 606 with a third party, e.g., the Data Repository 30. This communication may be authenticated with certification authority or Authentication Authority 642.

The Intermediary 10 then communicates 609 the User Public Session Key*Intermediary Private Session Key*Persistent Record (encryption or decryption) Key to the third party, e.g., Data Repository 30. The impending communication between third party and User 20 may be authenticated through the certification authority or Authentication Authority 640.

Figure 7:
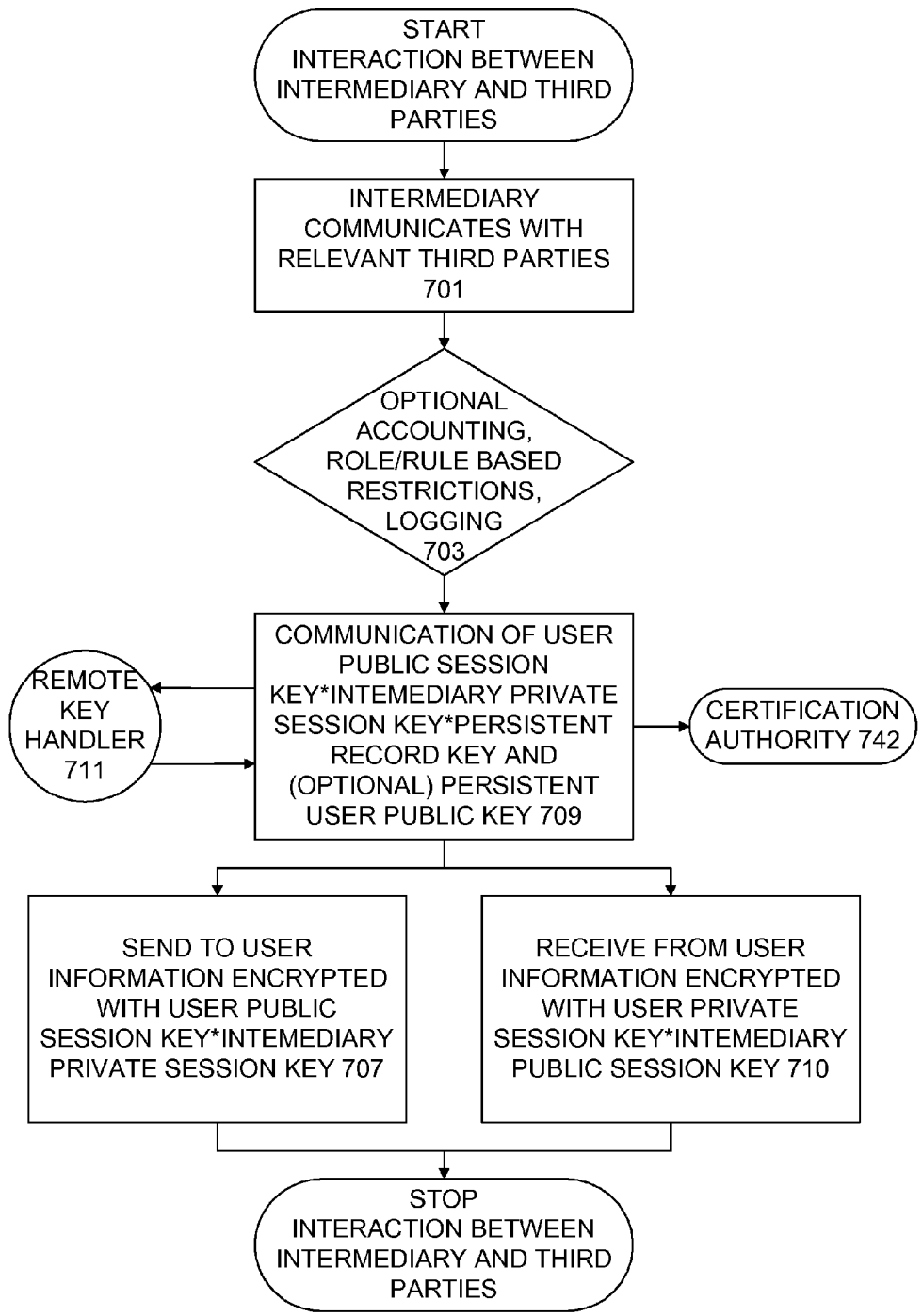
FIG. 7 shows a flowchart of the actions of a third party to the transaction according to the present invention.

FIG. 7 provides a flowchart of the actions of the third party, e.g., Data Repository 30 during typical transactions. The Intermediary 10 communicates 701 with the relevant third party or parties. The Intermediary 10 conducts 703 an optional accounting, implements rule and/or role based restrictions, and logs the transaction. The Intermediary 10 communicates 709 the Intermediary Private Session Key 1*User Public Session Key 1*Persistent Record Encryption Key and optionally, the Persistent User Public Key, through the third party, to the Remote Key Handler 711, where the Record Key is eliminated. A Certification Authority 742 may provide authentication services. The third party then sends 707 information to the User 20 encrypted with the User Public Session Key*Intermediary Private Session Key, or receives 710 from the User information encrypted with the User Private Session Key*Intermediary Public Session Key.

Figure 8:
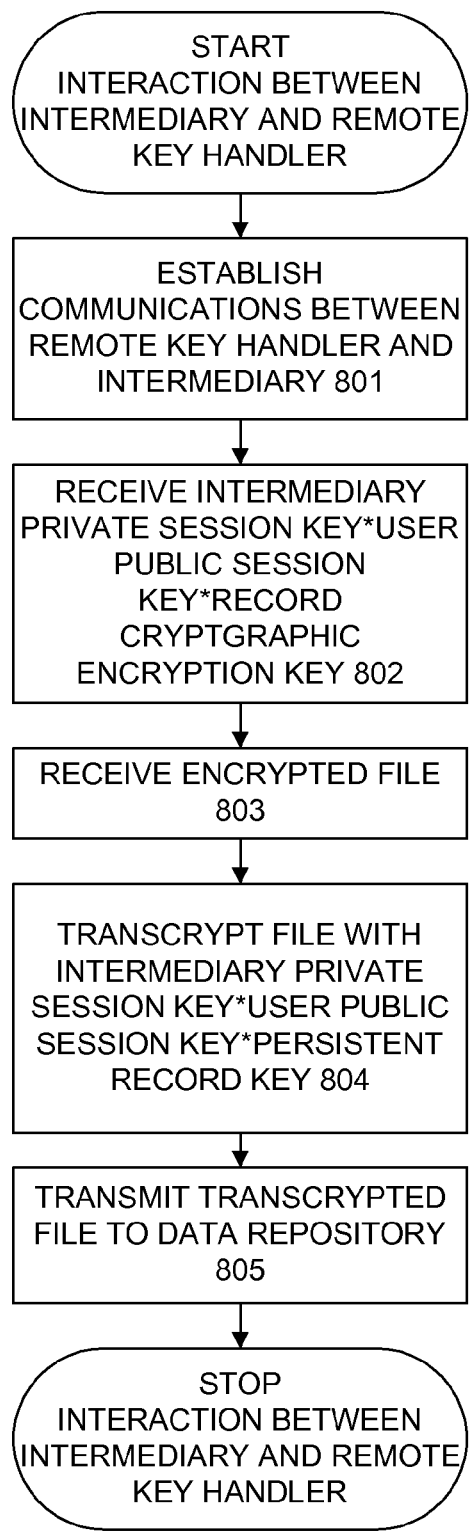
FIG. 8 shows a flowchart of the actions of the remote key handler according to the present invention.

FIG. 8 provides a flowchart of the actions of the Remote Key Handler 40 during typical transactions. Communications are established 801 between the Remote Key Handler 40 and the Intermediary 10. The Remote Key Handler 40 then receives 802 the Intermediary Private Session Key*User Public Session Key*Persistent Record (encryption or decryption) Key. An encrypted file is received 803 through a Data Repository 30, which is then transcrypted 804 with the received the Intermediary Private Session Key*User Public Session Key*Record Cryptographic (encryption or decryption) Key. The transcrypted file is then transmitted 805 to the Data Repository 30.

Figure 9:
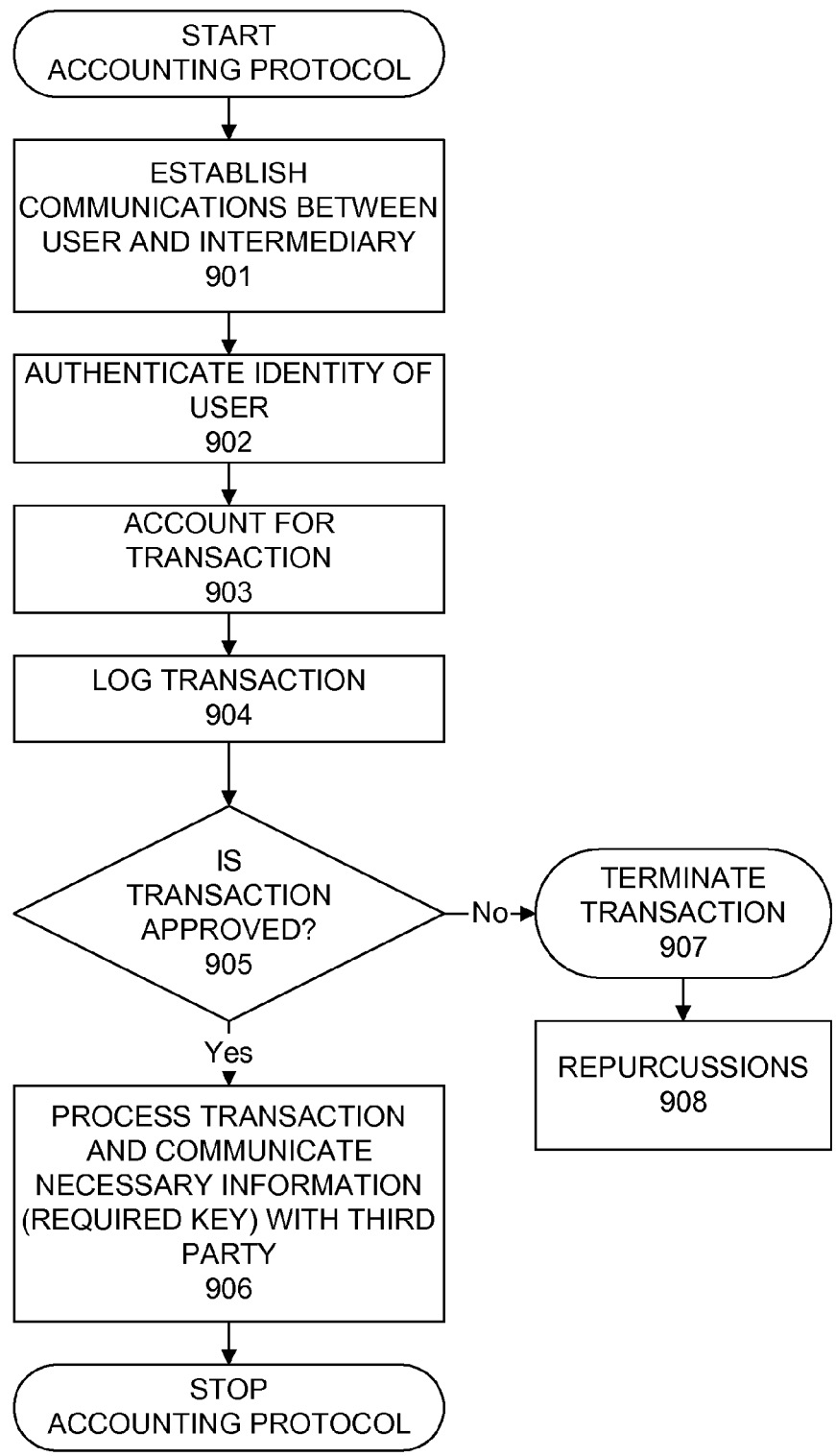
FIG. 9 provides a flowchart of an accounting protocol according to the present invention.

FIG. 9 provides a flowchart of an accounting protocol. Communications are established 901 between the User 20 and the Intermediary 10. The User 20 is authenticated 902. The transaction or proposed transaction is then accounted 903 for, for example by performing a financial charge against an account. The transaction and/or proposed transaction are then logged 904. The transaction parameters are then tested for approval 905, and if not approved, the transaction terminated 907 and various repercussions 908 implemented, for example, to ensure system security. If the transaction is approved, it is processed 906 and necessary key information communicated to facilitate the ultimate transaction between the User 20 and the third party, e.g., Data Repository 30.

Example 5

The algorithm according to the present invention may also be used in other circumstances where it is desired that a third party control decryption of a message without having access to the message itself. For example, a current trend is to secure electronic mail communications by providing a third party encryption, wherein the recipient must request a decryption key from a third party in order to reveal the message. This is advantageous, for example, where the availability of the decryption key is time limited, thus allowing the electronic communication to expire. See, www.disappearing.com. However, according to this known system, a symmetric cipher, i.e., the so-called Blowfish cipher, is employed. Therefore, if the encrypted message is made available to the server which hosts the encryption key, the privacy of the message is potentially impaired.

According to the present invention, see FIG. 3, the Intermediary never has access to sufficient information to decrypt any publicly transmitted information. Presuming that the Data Repository (receiver of the information) and the User, or sender of the information, choose to maintain the secrecy of the message, the interception of the message by the Intermediary does not impair the security of the system. Likewise, because security of the system does not require the Intermediary to be shielded from the ciphertext message, the Intermediary can, in fact, serve as a proxy or host for the communications, see FIG. 2.

Thus, in implementation, a secure three party communication system is provided as follows. The User 320 creates a message for the Data Repository 330. The Data Repository 330 publishes a public key, which is available to the User 320. The Intermediary 310 receives a message from the User 320, initiating a transaction. The User 320 receives a private session key from the Intermediary 310 as well as a unique identifier for the message. The User 320 then computes the composite encryption key from Data Repository Public Key *Intermediary Private Session Key, and encrypts the message using this composite key, and sends it to the Data Repository 330.

In order to decrypt the message, the Data Repository 330 communicates with the Intermediary 310, provides the unique identifier of the message, and receives the Intermediary Private Session Key. The Data Repository 330 then computes the composite decryption key from Data Repository Private Key *Intermediary Public Session Key, and decrypts the message using this composite key.

The session key pair generated by the Intermediary 310 is used once, and may be expired or controlled based on a set of rules. Thus, the Intermediary 310 may have a policy of destroying keys after a set time period or upon existence of a condition. Since the security of the encryption is analogous to RSA-type encryption, it can be made relatively secure. Since the Intermediary 310 has no access to the Data Repository Private Key, the message cannot be decrypted based on information available to it. In addition, higher order composite keys may be implemented, for example composites formed of three or more RSA-type keys, some of which may be enduring keys (for example to provide digital signature capability) and other session keys.

It is noted that various features of the known Dissapearing Inc. (San Francisco, Calif.) system, expressly incorporated herein by reference, may be employed in conjunction with the present invention. Thus, for example, special application software may be provided for restricting use by the recipient, thus preventing circumvention of the key restrictions.

Example 6

Another example according to the present invention provides a system for communicating a private message between two parties, wherein a third party controls access by the recipient to the message. Thus, an encrypted communication is sent by arbitrary means to a recipient, and a third party key management agent must communicate decryption information to the recipient in order to comprehend the message.

According to the present invention, in order for the recipient to obtain the necessary decryption information, accounting, authentication, and logging are implemented. According a to a preferred embodiment, the decryption is preferably implemented by controlled application software, which prevents export of the message, such as by printing, disk storage, or the like. Therefore, within a reasonable extent, the message is isolated within the controlled application. The right of the user to access a comprehensible version of the message may be temporally limited, for example with an expiration date. These rights may also be limited based on a specified condition. Further use would require either a new transmission of the message, or a further accounting and logging of activity. Further, this allows control over the message on a per use basis, potentially requiring each user of the controlled application to authenticate himself or herself, and provide accounting information. Each use and/or user may then be logged.

It is also possible to permit anonymity of one party, for example a sender of a message, by employing anonymous cryptographic protocols, such as a employed in micropayment technology. Thus, a sender of a message may provide a anonymous accounting by employing an anonymous micropayment to account for the message transmission with the Intermediary.

This technique therefore provides client-side security for messages, including medical records. By employing a third party for key management, burden on the sender is reduced.

Other embodiments will be apparent to those skilled in the art from consideration of the specification and practice of the invention disclosed herein. It is intended that the specification and examples be considered as exemplary only, with a true scope of the invention being indicated by the following claims.

What is claimed is:

1. A system for securing information, comprising:
   (a) a first port configured to receive encrypted information associated with a first set of cryptographic keys;
   (b) a second port configured to receive a portion of a set of transcryption keys from a key management system, derived at least in part from a first portion of the first set of cryptographic keys and a first portion of a set of session keys, adapted to transcrypt the encrypted information from a form associated with the first set of cryptographic keys to a form associated with a second set of cryptographic keys and the set of session keys, the received first portion of the set of transcryption keys conveying insufficient information to decrypt the encrypted information and to comprehend the transcrypted information, a second portion of the second set of cryptographic keys and a second portion of the set of session keys being required to comprehend the transcrypted information; and
   (c) a processor configured to transcrypt the received encrypted information from the first port into the transcrypted information dependent on the portion of the set of transcryption keys received from the second port, without either requiring or employing information sufficient to decrypt the encrypted information or to comprehend the transcrypted information.

2. The system according to claim 1, wherein the set of transcryption keys is a composite key representing a function of portions of two or more sets of cryptographic keys and at least one set of session keys, wherein the at least one set of session keys varies dynamically.

3. The system according to claim 1, wherein the first port is further configured to transmit transcrypted information, to a party in possession of the second portion of the second set of cryptographic keys.

4. The system according to claim 1, wherein the first set of cryptographic keys and the second set of cryptographic keys each comprise a public key and a private key related through a cryptographic algorithm.

5. The system according to claim 1, wherein at least one of the first set of cryptographic keys, the second set of cryptographic keys and the set of session keys comprise key pairs which are related through an elliptic curve cryptographic algorithm.

6. The system according to claim 1, wherein at least one of the first set of cryptographic keys, the second set of cryptographic keys and the set of session keys are key pairs which related through an El Gamal cryptographic algorithm.

7. The system according to claim 1, wherein at least one of the first set of cryptographic keys, the second set of cryptographic keys and the set of session keys are key pairs which related through a Rivest-Shamir-Adleman cryptographic algorithm.

8. The system according to claim 1, wherein at least one of the first set of cryptographic keys, the second set of cryptographic keys and the set of session keys are key pairs which related through a Diffie-Hellman cryptographic algorithm.

9. The system according to claim 1, wherein a server hosting the key management system is configured to generate the set of transcryption keys based on at least a portion of the first set of cryptographic keys, a portion of the second set of cryptographic keys, and a portion of the set of session keys, the server being further configured to negotiate the set of session keys, wherein the server is restricted from possession of a portion of the first set of cryptographic keys and a portion of the second set of cryptographic keys sufficient to comprehend the information.

10. A server for managing transcryption comprising:
    (a) a memory configured to store information representing at least a portion of a first set of cryptographic keys, and to store information representing at least a portion of a second set of cryptographic keys;
    (b) a processor configured to produce at least a transcryption key in dependence on a portion of the second set of cryptographic keys and at least a secret portion of the first set of cryptographic keys, the transcryption key being adapted to convert information encrypted based on the first set of cryptographic keys in which a secret portion of the first set of keys is required for decryption, to transcrypted information associated with the second set of cryptographic keys, employing a transcryption algorithm which does not either require or employ sufficient information to decrypt the encrypted information or to comprehend the transcrypted information; and
    (c) a port, configured to transmit the information representing at least a portion of the second set of cryptographic keys to a remote system, the information representing the portion of the second set of cryptographic keys being obscured from the processor with obscuration data.

11. The server in accordance with claim 10, further comprising at least one remote system, wherein the remote system receives at least the transmitted information representing at least a portion of the second set cryptographic keys, de-obscuration data, and the transcrypted information, and thereby possesses sufficient information to comprehend the transcrypted information.

12. The server according to claim 10, wherein the first and second sets of cryptographic keys each comprise an asymmetric cryptographic key pair, wherein the encrypted information is encrypted using one key of the first set of cryptographic keys, and the processor is configured to perform an algorithm based on at least the other of the first set of cryptographic keys maintained in secrecy, and one of the second set of cryptographic keys to produce a transcryption key,
    wherein after the encrypted message is processed with the transcryption key to produce transcrypted information, information dependent on the other of the second set of cryptographic keys is effective to comprehend the transcrypted information.

13. A method for transcrypting information, comprising:
    (a) receiving and storing in a first memory information encrypted based on a first set of cryptographic keys, a first portion of the first set of cryptographic keys having been employed to produce the encrypted information and a second portion of the first set of cryptographic keys being required to decrypt the information encrypted with the first portion of the first set of cryptographic information;
    (b) receiving and storing in a second memory a first portion of a second set of cryptographic keys, having a corresponding second portion of the second set of cryptographic keys being required for decryption of a message encrypted using the first portion of the second set of cryptographic keys;
    (c) negotiating a set of session keys through a communication port,
    (d) generating a transcryption key for transforming the received encrypted information to transcrypted information, in dependence on at least:
       (i) information representing the second portion of the first set of cryptographic keys,
       (ii) information representing the first portion of the second set of cryptographic keys; and
       (iii) a first portion of the set of session keys, and (e) transcrypting the stored encrypted information into transcrypted information using the transcryption key, wherein the generating a transcryption key step and the transcrypting the encrypted information step are performed without either requiring or employing sufficient information either to decrypt the encrypted information or to comprehend the transcrypted information.

14. The method according to claim 13, wherein at least one of: (i) the first set of cryptographic keys, (ii) the second set of cryptographic keys and (iii) the set of session keys, are key pairs which related through at least one cryptographic algorithm, selected from the group consisting of one or more of (i) an elliptic curve cryptographic algorithm, (ii) a Rivest-Shamir-Adleman cryptographic algorithm, (iii) an El Gamal cryptographic algorithm, and (iv) a Diffie-Hellman cryptographic algorithm.

15. The method according to claim 13, further comprising the steps of:

authenticating a remote system; and communicating the transcryption key to the authenticated remote system.

16. The method according to claim 15, further comprising communicating the transcrypted information from the authenticated remote system.

17. The method according to claim 13, further comprising the step of comprehending the transcrypted information using at least the information dependent on the second portion of the second set of cryptographic keys and information dependent on the set of transcryption keys.

18. The method according to claim 13, wherein the first set of cryptographic keys is associated with a first party, the second set of cryptographic keys is associated with a second party, and the method is conducted without exchanging cryptographic information between the first party and second party sufficient for decrypting the encrypted information or comprehending the transcrypted information.

19. The method according to claim 13, wherein generating a transcryption key and transcrypting the encrypted information are performed by separate entities at separate locations.

20. The method according to claim 13, wherein the set of session keys is dynamically generated for use in conjunction with a communication session, and the transcryption key and the second set of cryptographic keys together provide insufficient information to determine key components of the first set of cryptographic keys.

21. The method according to claim 13, wherein the set of session keys is negotiated through the communication port with an intended recipient of the transcrypted information.

\* \* \* \* \*